United States Patent [19]

Fry et al.

[11] Patent Number: 4,458,316
[45] Date of Patent: Jul. 3, 1984

[54] QUEUING COMMANDS IN A PERIPHERAL DATA STORAGE SYSTEM

[75] Inventors: Scott M. Fry; Harry O. Hempy; Charles R. Kirkpatrick, all of Tucson, Ariz.; Bruce E. Kittinger, Fort Collins, Colo.

[73] Assignee: International Business Machines Corporation, Armonk, N.Y.

[21] Appl. No.: 540,218

[22] Filed: Oct. 11, 1983

Related U.S. Application Data

[62] Division of Ser. No. 241,322, Mar. 6, 1981.

[51] Int. Cl.³ .......................... G06F 9/06; G06F 3/06
[52] U.S. Cl. .................................................. 364/200
[58] Field of Search .............................. 364/200, 900

[56] References Cited

U.S. PATENT DOCUMENTS

| | | | |
|---|---|---|---|
| 2,960,683 | 11/1960 | Gregory et al. | 364/200 |
| 3,156,897 | 11/1964 | Bahnsen et al. | 364/200 |
| 3,670,307 | 6/1972 | Arnold et al. | 364/200 |
| 3,670,309 | 6/1972 | Arnold et al. | 364/200 |
| 4,312,036 | 1/1982 | Porter et al. | 364/200 |
| 4,394,732 | 7/1983 | Swenson | 364/200 |
| 4,394,733 | 7/1983 | Swenson | 364/200 |

Primary Examiner—Harvey E. Springborn
Attorney, Agent, or Firm—H. F. Somermeyer

[57] ABSTRACT

Data transfers between a host processor and a peripheral data recorder in a peripheral data storage system, such as tape recorder peripheral data storage system, are via a random-access buffer store in the peripheral data storage system and interposed between the peripheral data recorder and the host processor. A command queue storage in the peripheral data storage system stores commands received from the host processor for the peripheral data recorder. Additionally, apparatus in the peripheral data storage system form commands for transferring data between the peripheral data recorder and the buffer store without intervention of the host processor; both read transfers (data transfer from the peripheral data recorder to the host processor) and write transfers (data transfer from the host processor to the peripheral data recorder) are enabled via the formed commands.

4 Claims, 17 Drawing Figures

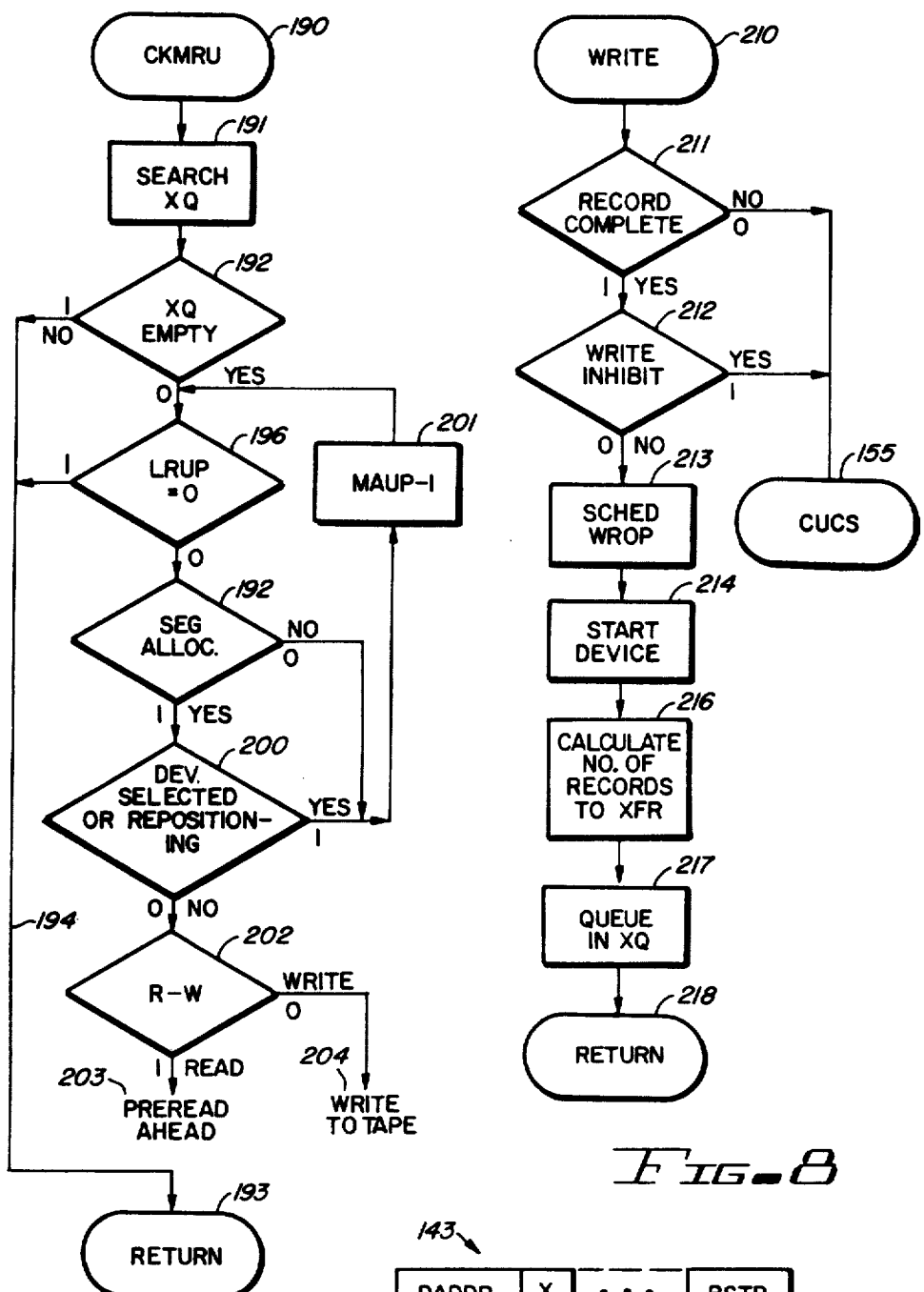

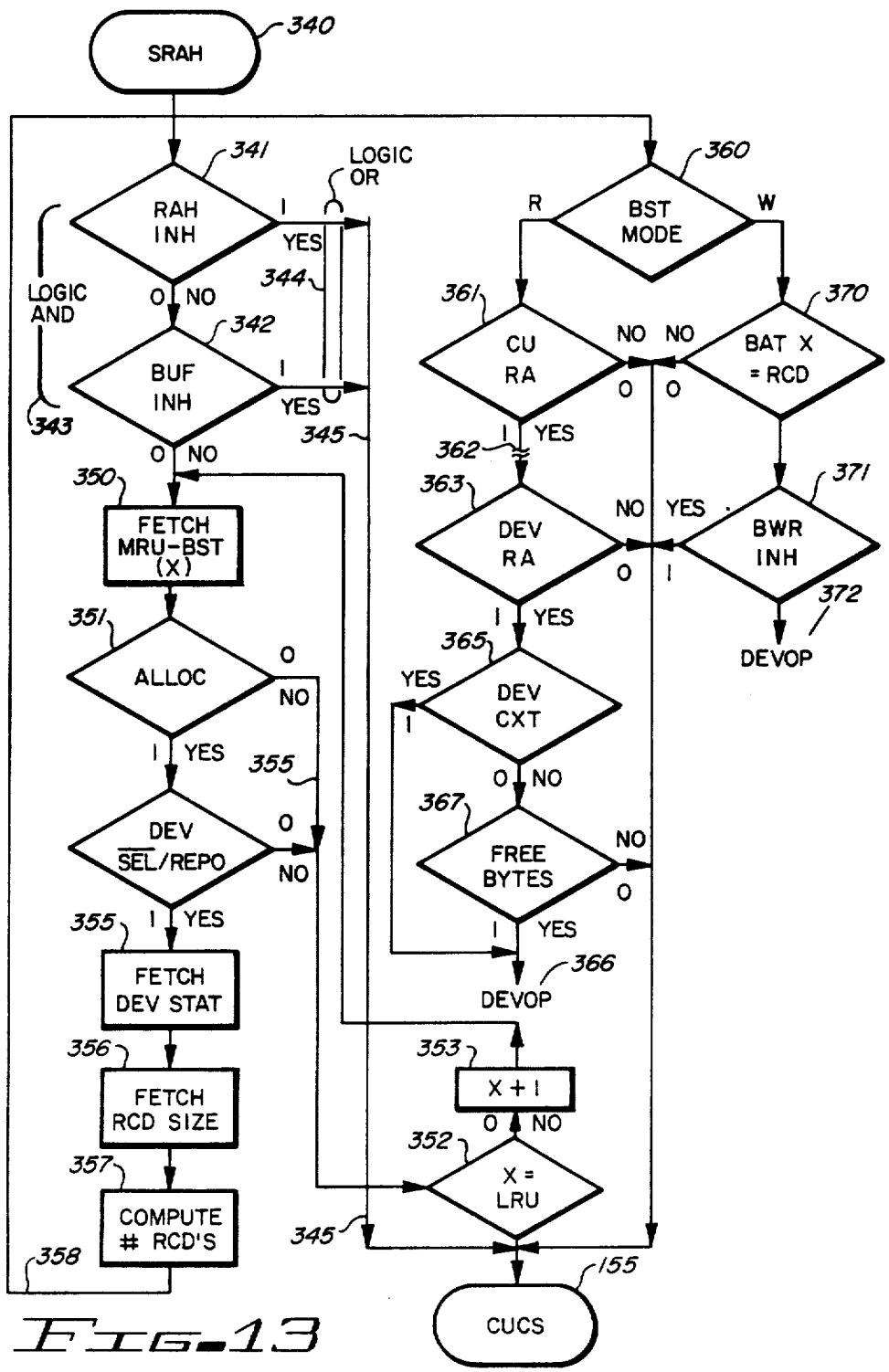

QUEUING COMMANDS IN A PERIPHERAL DATA STORAGE SYSTEM

This is a division of application Ser. No. 241,322 filed Mar. 6, 1981.

The present invention relates to operation and construction of peripheral subsystems, in particular those peripheral subsystems having a plurality of information-bearing signal handling devices sharing a managed buffer for scheduling operations between the devices and the buffer asynchronously with respect to a connected host system or other information-bearing signal-handling systems. The invention is particularly applicable to storage subsystems such as those storage subsystems employing magnetic tape recorders.

Peripheral storage subsystems attached to a host system, which may include one or more host computers, communicate with that system over a plurality of input/output channels. An example of such an input/output channel is described in publication GA22-6974-4, entitled "IBM System/360 System/370 I/O Interface Channel to Control Unit, Original Equipment Manufacturers' Information" (1978) available from International Business Machines Corporation, Data Processing Division, 1133 Westchester Avenue, White Plains, N.Y. 10604. Input/output operations employing that interface can employ "chains" of so-called channel commands which implement successive interactions between the peripheral subsystems and the host system. In a storage subsystem employing such input/output channels, a chain of commands usually has a so-called "modeset" channel command which informs the peripheral subsystem of the character of operations to be performed within a given chain of commands. For example, in a tape subsystem, a modeset would specify read or write modes, density of tape recording, and other information as may be desired for implementing a particular sequence of input/output operations. The same chain of commands includes a series of signal transfer commands, such as write or read which respectively cause transfer of signals from the host system to the tape recorder or in the reverse direction. Other commands can be interleaved in the chain, as is well-known in the data processing art.

Many tape subsystems provide a signal-buffering function between the tape recorder and the input/output channel; for example, in U.S. Patent Gregory et al U.S. Pat. No. 2,960,683, a buffer for containing a block of signals was interposed between a vacuum column tape-drive and a host computer. That is, the buffer was dedicated to operations with a tape drive. Subsequent to Gregory et al, some of the tape subsystems employed less buffering, i.e., 32 bytes of buffering as opposed to 4,096 bytes of buffering. In many instances, the buffer served a plurality of tape drives such that signal transfer between the host system and the tape subsystem was limited to one device at a time, i.e., all operations were synchronous at the block transfer level. All of this was made possible because the tape recorders employed mechanical buffering by so-called vacuum columns which enabled relatively rapid acceleration and deceleration of the tape record member.

Unfortunately, the vacuum column buffered tape recorders are expensive and occupy a relatively large volume of space. In a large data processing installation, such requirements impose severe restrictions on the growth of the installation and can require longer cables between the host system and the peripheral subsystem which not only increases cost but also increases signal propagation delays between the host and the peripheral subsystem, thereby limiting data rates. Accordingly, it is desired to replace the vacuum column or mechanically buffered tape recorders with so-called reel-to-reel tape recorders. Unfortunately, most reel-to-reel recorders have slower acceleration and deceleration characteristics such that direct connection via a relatively modest buffer to a host system results in unsatisfactory computer operation. As a result, a relatively large buffer will be interposed between the reel-to-reel tape recorder and the host system. If such large buffer was dedicated to each of the tape recorders, then the cost of the peripheral storage subsystem would be substantially increased. Therefore, it is desired to provide a managed buffer between the plurality of reel-to-reel tape recorders and a host system. The term managed buffer means that the size of the buffer is smaller than that which would be required to accommodate all of the tape recorders at one instant. Therefore portions of the buffer assigned to various tape recorders hereinafter called buffer segments are dynamically allocated to and deallocated from the various peripheral tape recorders in accordance with the data transfer needs imposed upon the tape storage subsystem by the host system.

For maximizing performance of a total subsystem with respect to the host system, transfers of signals between the various tape recorders (or other signal-handling devices) and the managed buffer should be relatively independent of the transfers between the managed buffer and the host system. By interleaving or overlapping these operations, a maximal performance can be achieved. Such independent transferring of data signals from a signal-handling device to a managed buffer is called promotion, while transfers of signals from the buffer to the device is termed demotion. The scheduling of these transfers should be in a manner to maximize transparency of such transfers to the host system and also should be achieved at a minimal cost.

Another aspect to the background of the present invention is the operation of buffers irrespective of whether the buffer is in a peripheral subsystem, attached to a main memory (such as a cache) or providing other rate changing and signal-handling isolation functions. The buffers attached to a main memory for buffering transfers between a processor and a main memory generally employ so-called "paging" techniques wherein the last processor-accessed request to main memory results in a promotion of data to the buffer from the main memory or backing store. For each recent request, there may be prefetch of associated data. Some of these prefetched transfers and transfers to the processor can be concurrent or interleaved for an effective concurrency. Examples of such apparatus are shown in Amdahl U.S. Pat. No. 3,670,309 and Arnold U.S. Pat. No. 3,670,307.

In addition to the promotion and demotion of data between a buffer and a backing store, there are so-called replacement algorithms. This means that, when data is inserted into a cache or buffer store, space must be made available. The data that is already stored in the buffer is replaced by newly requested data. This means that the old data must be erased from the buffer which may include demoting the data to the backing store. In this manner, the buffer is always full of data. Such replacement algorithms usually employ a so-called least recently used (LRU) algorithm in that the replaced data is that data in the buffer which has the longest elapsed time since the last access by the processor. The above cited U.S. patents also show such replacement algorithms.

None of the above-described techniques provide a satisfactory solution to the transfer of data signals between a plurality of peripheral signal handling devices and the host system through a managed buffer. Accordingly, low cost but effective scheduling of device operations and buffer management techniques are needed for enabling reel-to-reel tape drives to replace the mechanically buffered vacuum column tape drives heretofore used with host systems in the data processing art.

SUMMARY OF THE INVENTION

It is an object of the present invention to provide a single mechanism for controlling promotion and demotion of signals between a buffer and a plurality of backing store devices, plus replacement control of the buffer contents.

It is a further object of the invention to provide improved asynchronous signal transfers between a buffer and a plurality of signal handling devices such that connections between the buffer and other units is enhanced.

It is a feature of the invention to provide scheduling of signal-handling device operations with respect to a managed buffer which is determined by a chronological order of signal transfers from the buffer to other units (such as processors etc.) in combination with partial operations of replacement procedures for the buffer.

A chronological listing of accesses to portions of a managed buffer allocated to respective ones of a plurality of signal-handling devices controls both operation of the signal-handling devices and data replacements in the buffer. Such chronological list extends from a top of the list called most recently used (MRU) to the portion of a buffer that has the longest elapsed time since usage called least recently used (LRU). Such chronological list may have variations from a true chronology in that unallocated portions of the buffer, i.e., those portions not allocated to any device, will always appear at the LRU end of the chronological list but not necessarily in the order of chronology of exterior accesses to the buffer portions. The MRU end portion of the chronological list is closely tied to the external accesses to the buffer for ensuring a more true chronological order of that portion of the list.

The invention envisions a plural unit system having a plurality of signal-handling devices all connected to a managed buffer memory. The managed buffer memory is in turn connected to exterior means, such as the host system, for transferring signals therebetween. The external means supplies requests for signal transfers to the buffer memory. The chronology of those requests, as they apply to the signal-handling devices, is in turn relatable to allocated buffer segments. All of the buffer segments can be in a chronological list in accordance with such accesses and with the deallocation of the buffer segments from a device thus becoming LRU segments. The transfer of signals between the signal-handling devices and the managed buffer is in accordance with the ordering of the list from MRU to LRU. The allocated buffer segment which is on top of the MRU section of the lists is the first candidate for device-to-buffer and buffer-to-device signal transfers. If the associated device is busy or the buffer has a filled or empty condition indicating no device activity can occur, then the next device associated with the buffer segment next most recently used is examined for a next possible signal transfer system. The procedure is repeated until the LRU buffer segment is examined for possible signal transfers. Allocated and unallocated buffer segments can be interleaved in the list without interfering with the scheduling of device operations with respect to the buffer memory. The allocation of space in the buffer for a signal-handling device for the purpose of replacing the contents of the buffer segment with new data from a signal-handling device or signal-originating host proceeds from the LRU end of the chronological list to the MRU end of the chronological list. This single mechanism therefore provides scheduling not only of replacement and space management of the buffer, but also schedules device operations for ensuring that buffer signal-storing status is optimum with respect to the external transfers of signals between the buffer and a host system.

In particular, a buffered tape subsystem has a buffer with portions dynamically assignable to a number of tape recorders greater than the number of the buffer segments. Promotion and demotion of data signals to and from tape recorders are based upon the single chronological list of MRU-LRU buffer segments. The list is ordered in chronological access to the buffer segments by the host system and by time of deallocation of a buffer segment when a device no longer needs buffer space. Such removal of buffer space needs is based upon host systems commands to the buffer tape subsystem.

In a preferred form of the invention, a microprocessor schedules the buffer-to-device signal transfers based upon the single list. The top of the list is the most recently accessed buffer segment, and so forth, which results in data promotion/demotion to and from the buffer segment corresponding to the most recent signal transferring activity between the host system and the buffer memory. The buffer segments are preferably almost full or almost empty depending upon the data transfers, i.e., read or write from or to a tape recorder, respectively.

In accordance with the above specific form of the invention, data transfer scheduling between a host system and a plurality of signal-handling devices is enhanced through the single managed buffer system and its single control list.

DESCRIPTION OF THE DRAWING

FIG. 5 illustrates a set of registers from the control store illustrated in FIG. 4 relating to certain control aspects of a managed buffer shown in the FIGS. 1 and 2 illustrated peripheral subsystems.

FIG. 7 is a logic flow diagram illustrating operations of the FIGS. 1 and 2 illustrated peripheral subsystem for scheduling device operations in accordance with a first aspect of the invention.

FIG. 8 is a logic flow diagram illustrating the operation of the peripheral subsystem shown in FIGS. 1 and 2 for a data demotion operation.

FIG. 13 illustrates the logic flow for scheduling read-aheads for the promotion of data to a buffer in accordance with the logic of the FIG. 10 illustrated control.

FIG. 17 illustrates a single register from control store of FIG. 4 which relates to the current transfer of activities between a buffer memory of a peripheral subsystem and an attached host system.

DETAILED DESCRIPTION

Figure 1:
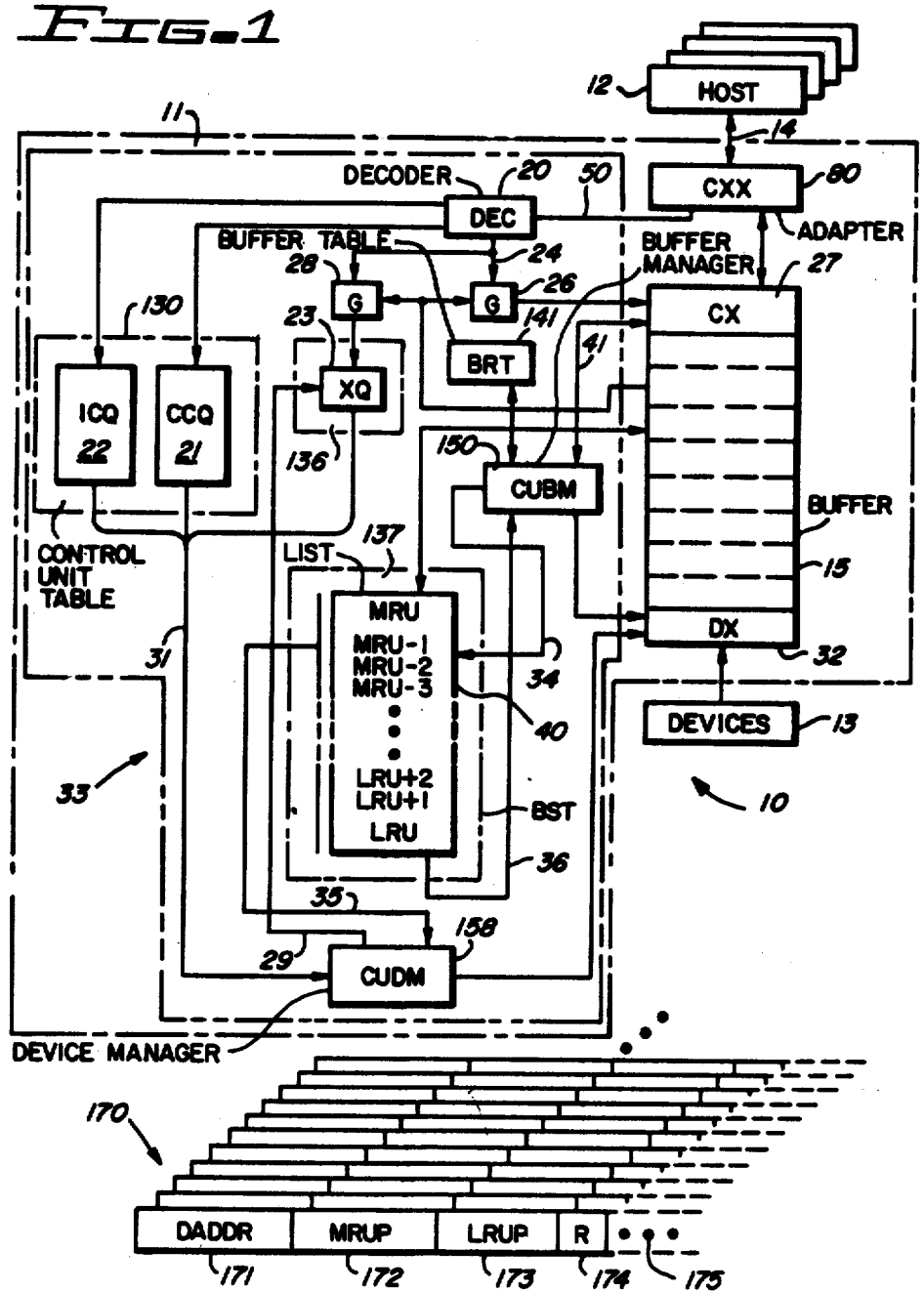
FIG. 1 is a block diagram illustrating the invention as employed in a peripheral subsystem attachable to a host system.

Referring now more particularly to the drawing, like numbers indicate like parts and structural features in the various diagrams. In FIG. 1 peripheral subsystem 10, shown as a magnetic tape recorder storage subsystem, is connected via its control unit 11 to a host system 12 including a plurality of hosts or central processing units. The control unit 11 provides data transfers between the plurality of devices 13, herein indicated as being reel-to-reel type of magnetic tape recorders, and host system 12 via an input/output channel 14. A single managed buffer 15 within control unit 11 masks the slow reel-to-reel device acceleration/deceleration characteristics from host system 12. The control 33 provided for control unit 11 by the present invention enables a high degree of interleaving of data transfers between host system 12 and buffer 15, and buffer 15 with devices 13. Host system 12 requests for data transfer either to or from subsystem 10 is usually handled directly from buffer 15 while the corresponding signal transfers between buffer 15 and the devices 13 is asynchronous to and substantially independent of each such transfer between host system 12 and buffer 15. In general, subsystem 10 employs host system 12 commanded or scheduled operation of devices 13. That is, a signal transfer between a host of system 12 and a device 13 can be synchronous through a buffer segment of buffer 15. It is preferred that the invention be employed for enhancing access to subsystem 11 such that the managing of buffer 15 in combination with the promotion and demotion of data between buffer 15 and devices 13 gives the appearance of a high performance storage subsystem usually not possible with reel-to-reel tape recorders. Control unit 11 scheduled operations between buffer 15 and devices 13 are termed asynchronous operations and insofar as host system 12 is concerned, such operations are unscheduled.

All operations of peripheral subsystem 10 depend upon commands and other control data received from host system 12 over input/output channel 14. Such commands are transferred through a channel adapter CXX 80, later described with respect to FIG. 2, then supplied over cable 50 to decoder 20. Decoder 20 responds to the command signals to initiate diverse operations within subsystem 10, as has been practiced in the data processing arts. To best implement the present invention while enabling prompt response of subsystem 10 to host system 12, all operations are queued. Control unit table CUT 130 contains a pair of FIFO (first in, first out) queues for enabling control unit 11 to promptly respond to host 12. FIFO CCQ 21 is a so-called channel command queue which schedules on a full basis of control information transfers from control unit 11 to an addressed one of the devices 13. In a similar manner, ICQ 22 enables scheduling transfer of sense information from a device 13 to control unit 11 for later transfer to host system 12. For example, a well-known SENSE command would be queued in ICQ 22. Data transfer operations which result in device 13 activities are in FIFO queue XQ, 23 which is a set of registers within device operation table DOT 136. All device operations are scheduled via XQ, 23 whether commanded by host system 12 or initiated by control unit 11, in accordance with practicing the present invention.

Decoder 20 also supplies a control signal over line 24 for indicating read or write operations and enabling gates 26 or 28. Buffer 15 supplies status information over lines 25 for each of the buffer segments in buffer 15 allocated to a device 13. Buffer status information is contained in buffer record table BRT 141. In a read operation, if a complete record is in a buffer segment of buffer 15 as indicated by BRT 141, gate 26 passes the decoder 20 line 24 signal to transfer circuit CX 27. CX 27 then transfers signals from the addressed buffer segment (addressed by addressing the device to which the buffer segment is allocated) through CXX 80 and input/output channel 14 to host system 12. On the other hand, if the buffer status is such that device activity is required, then gate 28 is activated to place the request for data transfer from decoder 20 into XQ 23. Queue XQ 23 includes the device address supplied with the command from host system 12 over cable 50. This will become more apparent with the continued reading of the specification.

Management of buffer 15 including updating of the hereinafter described chronological list is via CUBM 150, a portion of control 33. CUBM 150 manages allocation and deallocation of the segments of buffer 15 with respect to devices 13 in response to commands received from host system 12 as well as the operational status of subsystem 10. It further monitors the channel transfers between buffer 15 and input/output channel 14 via transfer circuits CX 27. CX 27 provides a signal over line 41 to CUBM 150 indicating a channel transfer resulting from accessing a given buffer segment in buffer 15. That buffer segment then becomes the most recently used (MRU) segment of buffer 15 and accordingly, since it is allocated to a device 13, indicates the most recently used device 13 in transferring signals between host system 12 and devices 13. The chronological list is a so-called MRU-LRU list 40 which resides in a set of registers within a buffer status table (BST) 137. List 40 is updated based upon a channel activity as described above and as indicated by numeral 34, all as later described in more detail.

Control of devices 13 by control unit 11 is vested in CUDM 158 which actuates transfer circuits DX 32 for transferring signals between buffer 15 and devices 13. DX 32 also communicates with CUBM 150.

FIFO queues 21-23 provide their signals to CUDM 158 for controlling devices 13. CUDM 158 scans list 40 as indicated by scan line 35, that is, CUDM 158 scans list 40 beginning at MRU, MRU-1, MRU-2, etc. through LRU for scheduling device 13 operations. Such device operations are scheduled by CUDM 158 supplying device instruction signals over line 29 to XQ 23. From this arrangement it is seen that XQ 23 not only queues the commanded operations received from gate 28, but also the unscheduled or asynchronous operations as received from CUDM 158.

List 40 also drives CUBM 150 replacement algorithm as indicated by connection 36. That is, to replace old data in buffer 15 with data newly requested or sent by host system 12, the data in the LRU buffer segment is first replaced, such as by demoting old data from the buffer 15 to a device 13, erasing same and taking corrective action with respect to the device 13 (as later described) and the like. The buffer segment is then assigned to a device requested by host system 12; followed by usual data transfer operations. From all of the above, it is seen that list 40 provides a hierarchy of synchronous operations to be performed in subsystem 10, as well as managing the memory space of buffer 15. The hierarchy of synchronous operations is based primarily by monitoring channel 14 accesses to buffer 15 via CX 27. Additionally, any deallocation of a buffer segment in buffer 15 results in that segment becoming the LRU segment. For example, a device 13 may be transferring signals with respect to host system 12. Host system 12 via input/output channel 14 supplies an indication that the chain of device operations is ending. When all the buffer activity with respect to that chain has been completed, then the buffer segment no longer need be allocated to device 13; then it is deallocated to become the LRU segment. The allocation of a buffer segment in buffer 15 to a device 13 does not alter its position in the MRU-LRU list 40. For example, LRU plus 2 may be deallocated upon receiving a new command from host system 12, control 33 assigns LRU plus 2 to device D4.

Such assignment constitutes an allocation of buffer space to D4; however, since no other buffer activity has occurred, the position in the MRU-LRU list 40 is not changed. It should be noted that CUDM 158, scanning MRULRU list 40 for starting asynchronous device operations, would eventually come to LRU +2; CUDM 158 sees that LRU +2 has an empty buffer space, is allocated to a device D4. A READ command then can cause D4 to store data in the allocated buffer segment identified as LRU +2, subsequent to the READ command. In this manner, data can be placed in buffer 15 even before host 12 has indicated any activity with respect to an addressed device 13, such as D4.

Figure 2:
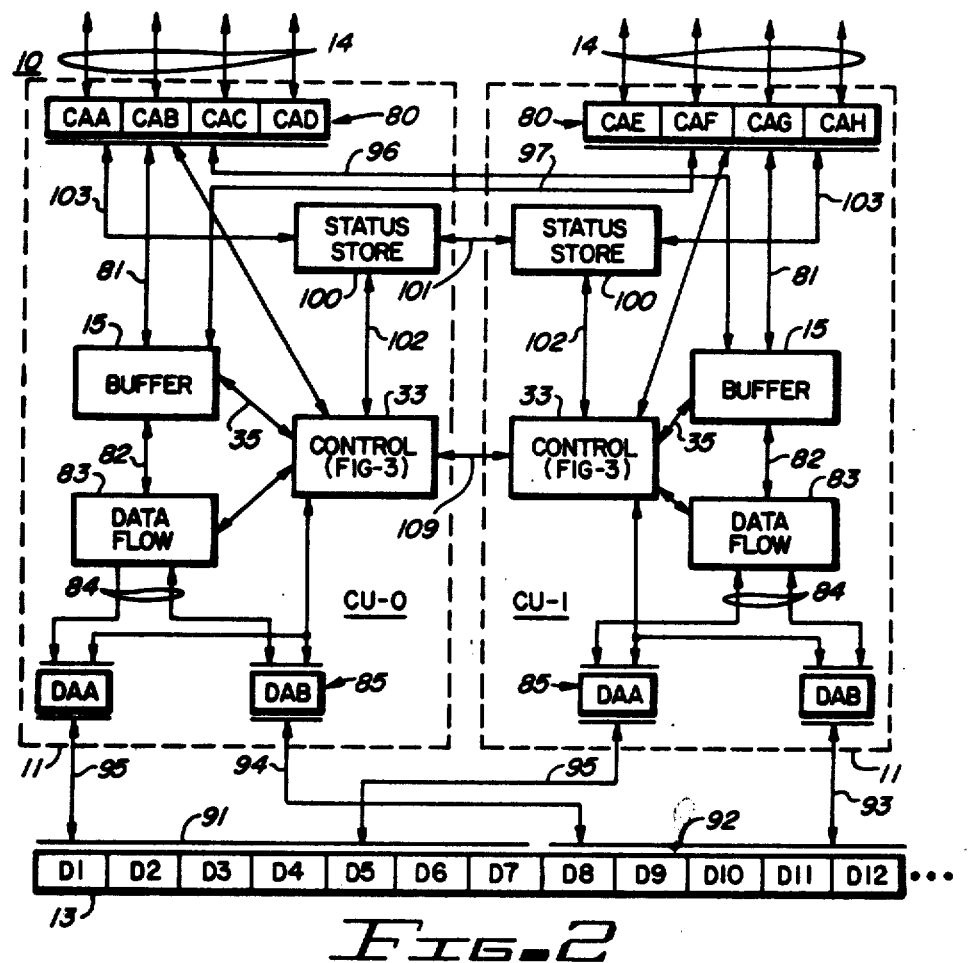
FIG. 2 is a block diagram for a peripheral subsystem showing certain constructional features thereof in a preferred form of implementing the invention.
Figure 3:
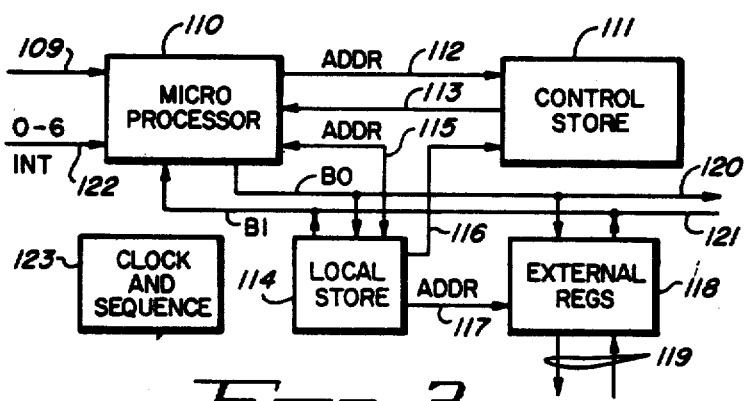
FIG. 3 is a block diagram of the control portion of the FIG. 2 illustrated peripheral subsystem.
Figure 4:
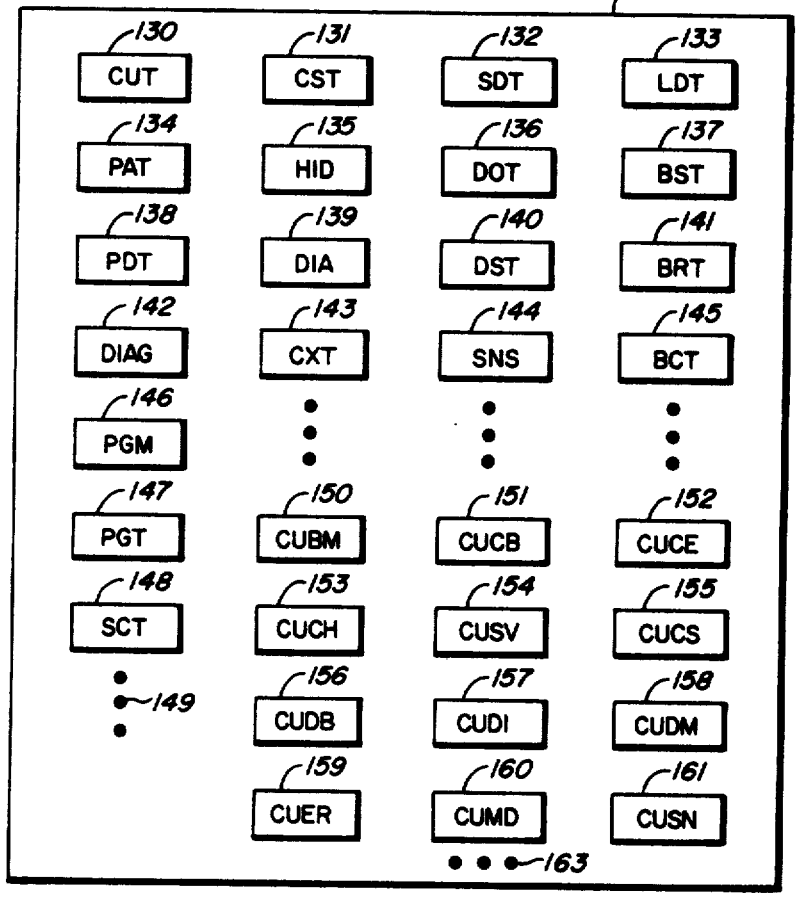
FIG. 4 shows the control memory arangement for the FIG. 3 illustrated control.

Before further describing the invention, the environment in which the invention preferably resides is described with particular reference to FIGS. 2-4 which illustrate a storage subsystem employing reel-to-reel tape drives denominated as devices 13 D1-D12. The preferred arrangement includes two control units 11 denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adapter circuits 80 which are individually denominated CAA-CAH. Each of the channel adapters 80 can communicate directly with a buffer 15 in either control unit 11. Both CU-0 and CU-1 are identically constructed. Accordingly, like numerals are indicating like parts in the two control units with the interconnections between the control units being separately denominated. Channel adapters CAA-CAD are in CU-0 while CAE-CAH are in CU-1. The respective channel adapters communicate with a buffer 15 in their own control unit via cable 81. Communications from the buffers to the devices 13 are over cable 82 through a data flow circuit 83, thence to cable 84 through a plurality of device adapter circuits 85. The device adapter circuits are separately denominated by characters DAA through DAQ in both control units 11. Data flow circuits 83 contain recording circuits. The programmed control 33 is electrically connected to all of the described portions of the respective control units 11 and operates generally in a known manner for storage subsystems as generally shown in Irwin U.S. Pat. No. 3,654,617, filed in U.S.A. Oct. 1, 1970, application Ser. No. 77,088. The interconnections between the control units 11 and the devices 13 is on a primary/secondary basis. Devices D1-D7 are primary to CU-0 and secondary to CU-1. In a similar vein, devices D8-D16 (D13-D16 not shown) are primary to CU-1 and secondary to CU-0. The significance of primary and secondary connections relates to which of the control units CU-0 or CU-1 maintain status for the respective devices; i.e., the control unit CU-0 maintains status information for D1-D8 while CU-1 primarily maintains status information for D8-D16. As will become apparent, both control units CU-0 and CU-1 memorize status indications for all of the devices 13. In the primary connections, adapters DAA-DAQ of CU-0 are connected via a cable 90 to all of the devices D1-D8. In a similar manner, the connection of D8-D16 to CU-1 is via cable 93 through adapters DAA-DAQ. The secondary connection from CU-0 to devices D8-D16 is via cable 94 while CU-1 is connected to devices D1-D8 via cable 95. The operations between the device adapters 85 and the various devices D1-D16 includes tag control lines and bus data transfer lines which enable the control units 11 to closely control and operate device 13.

In prior tape subsystems, the data flow paths were not fully multi-pathed in that the channel adapters 80 communicated only with the data flow circuits 83 in its respective control unit 11. In the preferred configuration, any of the channel adapters CAA-CAH can communicate with any of the devices 13 through either data flow circuit 83. The internal control unit 11 connections from the channel adapter CAA through CAD and adapters CAE-CAH of CU-1 are as previously described. Connections from channel adapters CAA-CAD to the buffer 15 of CU-1 are via cable 96 whereas channel adapters CAE-CAH connect to the buffer 15 of CU-0 via cable 97. Accordingly, either data flow circuit 83 or buffer 15 can communicate with any of the hosts via any of the channel adapters. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any crossconnection between the channel adapters 80 and the buffers 15 is immediately indicated in both status stores 100. Each of the status stores 100 contains a plurality of registers for containing bits relating to device status, buffer status, channel status and the like. Such status information reflects the selection status of the device, its busy status, contingent connections and all other status necessary for operating the storage subsystem with the input/output channel 14.

One and only one control unit 11 can change the configuration of the storage system at a given time. In this regard, cables 102 extend from the respective status store 100 to control 33. When control 33 of CU-0 wants to change logical configuration of the subsystem by selecting a device 13, for example, control 33 communicates with its status store 100 and requests permission to change subsystem status. Status store 100 is in an appropriate master state and permits control 33 to make a selection. Otherwise, status store 100 of CU-0 requests the status store 100 of CU-1 to give it the master state. Either CU 11 having the master state is the only one which can change logical configuration of the subsystem, the master state being shifted between the control units as configuration changes dictate. Status stores 100 also communicate with the respective channel adapters in the control units 11 via cables 103. Such communication includes the supplying of device busy status to the channel adapters from the status stores and the request for selection from the channel adapters to the status stores; that is, if CAB 80 wants to select device D6 on behalf of a host request, CAB 80 communicates with its status store 100 of CU-0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode program stored in control store 111. Such microprograms enable microprocessor 110 to completely manage buffer 15, to provide supervised data flow circuit 83, to communicate with status store 100, and to supervise and enable selection of the channel adapters 80 and device adapters 85. Further communication between controls 33 in the two CU's 11 on a processor-to-processor basis is via cable 109 using known interprocessor communications techniques. Using known techniques, microprocessor 110 selects the microprograms of control store 111 via address bus 112. Control data is supplied from the control store 11, including microprogram instruction words, via bus 113. Of course, the usual idle scan loop for operating microprocessor 110 is resident in control store 111. Additionally, control 33 includes local store 114 which acts as a working control store for microprocessor 110. The addressible registers of local store 114 are addressed via bus 115. Bus 116 transfers signals from local store 114 to control store 111 under control of microprocessor 110; that is, it is preferred that the data stored in control store 111 from microprocessor 110 be transferred via local store 114. Communications between control 33 and all of the items shown in the control units 11 are via sets of external registers 118 which are addressed by address signals supplied over bus 117 from local store 114, no limitation thereto intended. Communications from external registers 118 to the various elements of the control units 11 are via a pair of unidirectional buses 119, which are electrical connections made in the usual manner.

Microprocessor 110 includes the bus out BO 120 and a bus in BI 121 which are connected to local store 114, external registers 118 and other units as may be desired.

Microprocessor 110 is interrupt driven through a plurality of interrupt levels. These interrupts are supplied by the various elements of the control unit 11 over bus 122 which carries interrupt signals having levels 0 through 6, the priority of which is preassigned in accordance with the functions to be performed in the storage subsystem. The electrical signal timing of control units 11 is by clock and sequencer 123. Not only does clock and sequencer 123 provide timing pulses, but sequences microprocessor 110 for initializing control 33 to properly operate the control unit 11. The connections 119 from external registers 118 are to all the other portions of control unit 11.

FIG. 4 is a map of control store 111 showing control tables and microprogram groups. The tables, of course, consist of registers in control store 111 that contain those signals representing control information necessary for the successful operation of the storage subsystem. First the tables are described.

CUT 130 is a so-called control unit operation table which contains information-bearing signals pertaining to the entire control unit 11. This table relates to the operational status of the individual control unit CU-0 and CU-1 which is not device 13 nor channel 14 related. CST 131 is a command status table which contains information-bearing signals describing the current command status which is being executed for an addressed device 13; that is, host 12 supplies channel commands over I/O channel 14 to the respective control units 11. CST 131 reflects the present status of the execution of those commands received by any of the channel adapters 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15, and the broad operational status of the respective devices in which status information is more general in character than that appearing in SDT 132. PAT 134 is pending allocation table having information-bearing signals which queue devices 13 by their respective addresses which require buffer space when buffer space has not yet been allocated. The table is preferably a FIFO (first in, first out) table. HID 135 is a table containing host identification signals for the hosts 12 communicating with the control units 11 via channel adapters 80. DOT 136 relates to device operations and contains information-bearing signals signifying schedule, active and completed device 13 operations. Such operations include tape transport, reading and writing and the like.

BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information signals signifying device information; control data relating to devices 13 and concerned with input/output channel 14 as well as intercontrol unit communication over cable 109 is stored here. Such information may originate because of device 13 operations as well as channel 14 operations. DST 140 stores information bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15. DIAG 142 is a table used to control diagnostic functions executed in the control unit 11. CXT 143 contains information-bearing signals relating to transfer of signals between buffer 15 and any of the I/O channels 14 via the channel adapters 80. Such information includes direction of transfer and the address of the device 13 related to such transfer. SNS 144 holds information-bearing signals representing sense data to be reported to a host 12 as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. Path group table PGT 147 complements PGM 146 in that it includes identification signals identifying the logical partition and which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such entry may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various program groups include CUBM 150 which are the microcode programs relating to the management of a buffer 15. CUCB 151 identifies those microcode programs relating to the transfer of signals between an I/O channel 14 and buffer 15 via channel adapters 80. CUCE 152 relates to setting up the tables described above in preparation for executing a command received from a host 12 over input/output channel 14. CUCH 153 relates to the channel control aspects, such as device selection and the like. CUSV 154 relates to an interrupt supervisor as it uses scan vectors in determining priority of the interrupts. CUCS 155 is a command support set of microcode which executes the commands set up by CUCE 152. CUDB 156 relates to the control and supervision of signal transfers between devices 13 and buffer 15. CUDI 157 relates to the control of the device adapters 85. CUDM 158 relates to the management of devices 13 such as scheduling their operations, etc. CUER 159 relates to error detection and recovery microcode. CUMD 160 relates to diagnostic procedures executed by a control unit 11. CUSN 161 relates to handling sense data such as stores in SNS 144. Numeral 163 indicates that the above program groupings may be modified and extended as the need arises for a storage subsystem.

The generation and utilization of MRU-LRU list 40 is described with particular reference to FIG. 5 and the tables below. The mechanism for containing the MRU-LRU list 40 is registers 170 of BST 137. One register is assigned to each of the buffer segments in buffer 15. Each buffer segment will have a corresponding register 170 in BST 137 irrespective of its allocation to a device 13, whether it is demarked (which prevents usage of that buffer segment) or whether or not it is paired with another buffer segment. Paired buffer segments have one entry in MRU-LRU 40 for both segments of the pair; this means one segment is deleted from the MRU-LRU 40 list. Such a segment pair becomes a macro segment or partition of buffer 15. The registers 170 are addressable in control store 111 through known as base plus offset addressing. For example, a separate register (not shown) within control 33 contains an address pointing to the MRU entry of BST 137 and a second register (not shown) contains an address pointing to the LRU-representing register 170. All other registers are addressed based upon the device address or the MRU pointer (MRUP) or the LRU pointer (LRUP) via an address translation table of known design.

Each of the registers 170 has a register section 171 for containing a device address to which the associated buffer segment is allocated. Each segment is defined by a starting and an ending address which define a contiguous block of buffer 15 address space such as 40,000 byte (40 KB) registers. These segments can be combined to provide larger segments for handling transfer of larger blocks of signals. For example, two segments can be combined to form an 80 KB buffer partition called a paired or biped partition. Four of such segments can be combined for forming a segment quad, etc. By convention, the segment having the lowest address of the combined logically contiguous buffer segments will be the segment in BST 137 used in connection with the MRU-LRU 40. A portion of the registers 170 pertaining to such segmentation is not shown for simplifying the description.

A second section 172 of each of the registers 170 contains MRUP, i.e., a pointer to the device which is next "higher" (numerically closer to MRU) on the MRU-LRU list 40; that is, the device which is next more recently used with respect to the segment identified by the respective register 170. In a similar manner, the third section 173 contains LRUP which points to the device address of the segment next less recently used buffer segment. Therefore, each register has an MRU pointer pointing to the "top" (MRU end) of the list 40 and a backward or downward pointer pointing toward the LRU end of list 40. All of the MRUP's, when taken as an ordered list, signify the order of scheduling of data promotion and demotion in subsystem 10 based upon the mechanism of the present invention. In a similar manner, all of the LRUP's, taken as a set, guide the buffer replacement algorithm.

A fourth section, 174, of each of the registers 170 indicates the direction of data transfer. This fourth section, 174, is set by CUCE 152 in processing a so-called MODE SET command received from a host 12 and mentioned in the background portion of the specification. An R indicates it is in the read mode wherein signals are transferred from a device 13 to a host in system 12. A W indicates a write mode wherein signals are transferred from a host in system 12 to a device 13. R may be represented by a binary zero and W by a binary 1. Numeral 175 indicates that additional entries in BST 137 may occur in a practical constructed version of the present invention.

While BST 137 points to buffer operations, it can also be viewed as controlling a logical device consisting of a real device 13 together with its allocated buffer segment. Additional status in BST 137 may include whether or not there is an outstanding channel command, whether the segment is scheduled for freeing (host system 12 has indicated no more data transfers with an addressed device, therefore when the buffer operation with respect to a device is completed, it can be made a free or deallocated segment), a diagnostic mode bit or an error recovery bit, a demarking segment-in-error bit, the combination status with other segments for making a single allocatable segment larger than base segment size, data transfer status, such as incomplete records for read or write, reconnect status, direction, i.e., forward or backward, record count, space available for receiving data signals and the like as well as address pointers to BRT 141 in connection with the control of record management within the segment identified by the respective register 170.

The maintenance of MRU-LRU 40 is best understood by reference to the tables BST-1 through BST-4. Table BST-1 shows a snapshot of MRU-LRU 40 during a given processing set of operations wherein devices D-0 through D-A have allocated buffer segments, and no buffer segment is unallocated. The buffer segment identified with device D0 means the LRU segment, while the buffer segment identified with device address D5 is the MRU segment. It will be recognized that MRUP and LRUP constitute the well-known doubly-linked list widely used in the data processing art.

BST-1

| DADDR | MRUP | LRUP |
|-------|------|------|
| D0    | D8   | 0    |
| D1    | D6   | D4   |
| D2    | D9   | D3   |
| D3    | D2   | D8   |
| D4    | D1   | DA   |
| D5    | 0    | D6   |
| D6    | D5   | D1   |
| D7    | DA   | D9   |
| D8    | D3   | D0   |
| D9    | D7   | D2   |
| DA    | D4   | D7   |

Two changes in subsystem status which will affect the MRU-LRU 40 list set forth in BST-1 are explained. First, the buffer segment allocated to device D2 is deleted, and the second change is that device D8 segment becomes the MRU segment. These changes are set forth in Table BST-2 below:

BST-2

| DADDR | MRUP | LRUP |
|-------|------|------|
| D0    | D3   | 0    |
| D1    | D6   | D4   |
| —     | —    | —    |
| D3    | D9   | D0   |
| D4    | D1   | DA   |
| D5    | D8   | D6   |
| D6    | D5   | D1   |
| D7    | DA   | D9   |
| D8    | 0    | D5   |
| D9    | D7   | D3   |
| DA    | D4   | D7   |

Examining BST-2, it is seen that device address D2 is deleted from its entry, and that MRUP and LRUP of the segment are also deleted. This situation identifies a deleted segment. If a segment had been deallocated, then only the device address would be deleted; the MRUP and LRUP still would have numerical values pointing to the MRU and the LRU adjacent items. In BST-2 D8 becomes the MRU segment. In the BST-1 list, D8 is logically between device D0, which is the next least recently used buffer segment, and D3, which is the next most recently used buffer segment. The list must be closed between devices D0 and D3. This is achieved as shown for device entry D0 wherein its MRUP is changed from D8 to D3, and the D3 LRUP is changed from D8 to D0. No other entries are changed. The order from MRU to LRU and BST-1 and BST-2 can be determined by examining the MRUP and LRUP list and sorting the device addresses in accordance with those pointers.

The next change explained with respect to MRU-LRU 40 is that the MRU segment D8 is deallocated as a first step, and a new segment is added to the MRU-LRU list as segment DB. The added segment becomes the new LRU segment. See table BST-3.

BST-3

| DADDR | MRUP | LRUP |
|-------|------|------|
| D0    | D3   | D8 Old LRU |
| D1    | D6   | D4   |
| —     | —    | —    |
| D3    | D9   | D0   |
| D4    | D1   | DA   |
| D5    | 0    | D6 New MRU Segment |
| D6    | D5   | D1   |
| D7    | DA   | D9   |
|       | D0   | DB Deallocated |
| D9    | D7   | D3   |
| DA    | D4   | D7   |
| DB    | D8   | 0 Added Segment |

Examination of BST-3 shows that entry D0, the old LRU, was changed by making its LRUP change from 0 to D8, the deallocated segment. Because of adding segment DB, the LRUP of D8 is DB, the MRUP of DB becomes D8 with its LRUP being equal to zero indicating it is the LRU segment. In a similar manner a zero in the MRUP indicates the new MRU segment.

Changing BST-3, the old LRU segment DB becomes the new MRU segment as shown in BST-4 below:

BST-4

| DADDR | MRUP | LRUP | SEG ADDR |
|-------|------|------|----------|
| D0    | D3   | D8   | 4        |
| D1    | D6   | D4   | 5        |
| —     | —    | —    | 9        |
| D3    | D9   | D0   | 2        |
| D4    | D1   | DA   | 7        |
| D5    | DB   | D6   | B Old MRU |

BST-4-continued

| DADDR | MRUP | LRUP | SEG ADDR | |
|---|---|---|---|---|
| D6 | D5 | D1 | 3 | |
| D7 | DA | D9 | A | |
|  | D0 | 0 | 6 | New LRU |
| D9 | D7 | D3 | 8 | |
| DA | D4 | D7 | 0 | |
| DB | 0 | D5 | 1 | Old LRU, New MRU |

The old LRU segment DB has its MRUP changed to zero, indicating it is MRU. Its LRUP is D5, which points to the old MRU segment which has an MRUP of DB. The new LRU is the old LRU plus 1 segment. The deallocated D8 segment is indicated by LRUP being changed to zero.

All of the above tables use a device address to identify the buffer segments because, generally, a buffer segment is allocated to a device and it is convenient to refer to it as such. In a practical embodiment, each buffer segment would have its own memory address as indicated in BST-4 in the right-hand column (SEG ADDR). These relative addresses 0 through B have no relationship to the assignment of the device to the buffer segment. The segment memory addresses, of course, never change.

It is remembered that allocation of a segment to a device does not change its ranking in the MRU-LRU 40 list. Most of the changes in the list are either done at the MRU end or the LRU end of the list as described for BST-1 through BST-4. If a segment is determined to be in error (non-usable) or upon merger of segments, then the segment can be removed from the center of the list 40. A detailed description of how this is achieved in the preferred embodiment of the invention is described later with respect to FIGS. 10 through 13, which will also refer to these tables and to FIG. 5.

Figure 6:
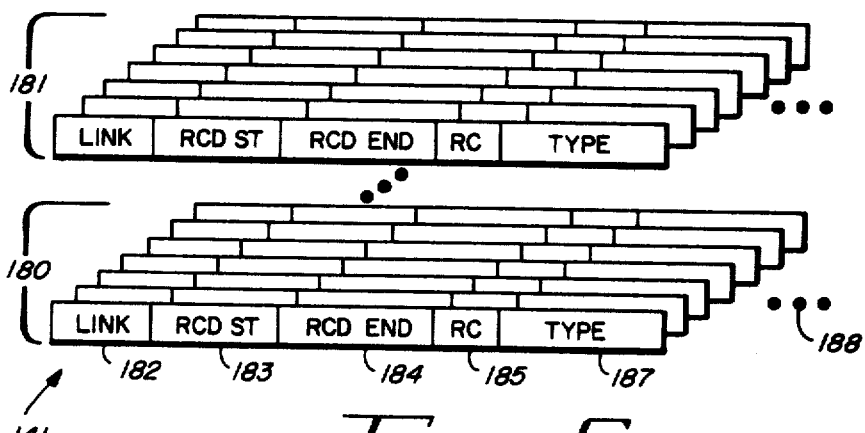
FIG. 6 illustrates a plurality of sets of registers from the FIG. 4 illustrated control store which relates to control of information-containing record transfers tnrough the buffer as used in the FIGS. 1 and 2 illustrated peripheral subsytems.

BRT 141 is next described with reference to FIG. 6. BRT 141 contains a plurality of registers arranged into sets of linked-list registers 180, 181. Each set of registers 180, 181 is for a predetermined buffer segment. For example, if there are ten buffer segments in buffer 15, then there will be ten sets of BRT 141 registers that form link list registers. Every record of signals stored within a given buffer segment will have one associated entry in BRT 141 in a respective register in the associated sets of registers 180, 181. The link list registers will link all entries together such that each and every record in the segment is linked to every other record in chronological sequence of receipt such that the buffer segment will operate as a FIFO buffer. The BRT 141 registers not linked (unassigned registers) form a pool of available registers for any of the buffer segments. The link list registers are logically associated and can be dispersed throughout control store 111 within a given address range; that is, each link list register is not necessarily adjacent to other registers in the same link list. Accordingly, the maximum number of entries into BRT 141 for all of the segments in buffer 15 is dependent upon the unused registers 180, 181. At a given instant before a BRT 141 register is allocated to a record, a test is made by control 33 via microprocessor 110 to determine whether or not the device assigned for the respective buffer segment has more or less than one half of the available BRT 141 registers allocated to it. If more than one half, then no more BRT entries will be allocated to that device, thereby indicating that the buffer segment is full because of limitations in BRT 141 entry storage capability. The link lists of BRT 141 entries are addressed via BST 137; that is, each BST 137 register has an address pointing to the BRT 141 register that contains the first received record in the segment associated with the BST 137 register. As records leave buffer 15, this pointer is adjusted to dynamically point to the BRT 141 entry corresponding to the instant first-received record in the buffer segment. For purposes of explaining the present invention, the sections of BRT 141 registers are described. A first section 182 contains the link to the next BRT 141 entry associated with that given segment; that is, the register associated with the first record in any segment is pointed to by BST 137. That first register has its section 182 with an address pointing to the next register associated with the second received record, etc. As records are removed from the buffer segment, the link lists are updated using known data processing techniques. Register section 183 contains the address in the associated buffer segment at which the records stored in the buffer segment and identified by the respective BRT 141 register have a starting address for the entire record. In a similar manner register section 184 stores the ending address for a given record. Of course, the second register in BRT 141 would have a record starting address in section 183 which is one greater than the ending address stored in section 184 of the first BRT 141 register, etc. RC section 185 contains indicia indicating the completeness of the record; that is, whether or not the complete record is presently stored in the associated buffer segment. The same bit also indicates validity of subsequent entries in the BRT 141 registers. Section 187 indicates the type of record stored. That is, data, image, non-coded information, tapemark, erased gap information, density marks or other control or data types that may be used in connection with the operation of peripheral subsystems of diverse types. Numeral 188 indicates that a typical BRT 141 will have entries of interest for the operation of a subsystem but not pertinent to an understanding of the present invention.

Figures 9, 11:
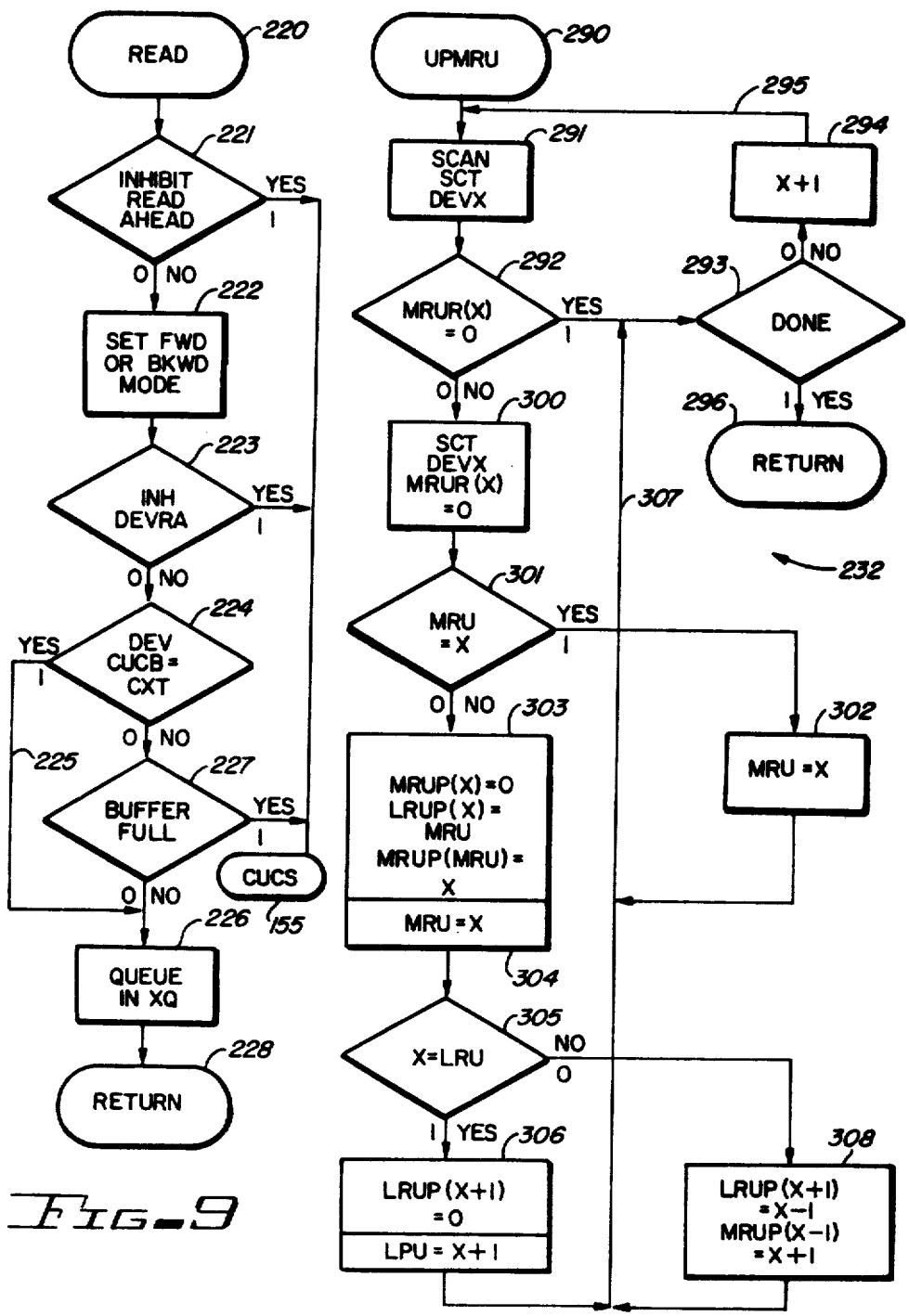
FIG. 9 is a logic flow diagram showing preparation of data promotion instituted by the logic of FIG. 7 within the peripheral subsystems of FIGS. 1 and 2.
FIG. 11 is a logic flow diagram showing updating an MRU section of the control of the FIGS. 1 and 2 illustrated peripheral subsystems.

FIGS. 7, 8 and 9 illustrate a generalized logic of operation of the invention in a preferred mode. Microprocessor 110 responds to the programs stored in control store 111 for executing functions described herein. Microprocessor 110 has a plural interrupt level scheme as indicated by arrow 122 of FIG. 3. All levels of interrupt handle priority operations within subsystem 10 in accordance with this interrupt scheme. When none of the interrupt levels are active, microprocessor 110 is placed in a so-called idle scan, as later described. Such idle scan is a usual technique at a low interrupt level for enabling a programmed controller to search for work to be done. In the present instance, such idle scan checks for time outs, completions of device 13 operations, requests for diagnostic services, presenting so-called deferred unit checks, handling control unit 11 status and scheduling asynchronous device operations in accordance with practicing the present invention. One of the steps in idle scan is shown in FIG. 7 which checks MRU-LRU 40 as indicated at 190. The first operation in this check is to search work queue XQ at step 191. XQ 23 can be constructed similarly to the link list described for BRT 141. Accordingly, by scanning the list addresses of XQ 23 it can be easily determined whether or not a device operation has been scheduled. Results of the search are logged in a work register (not shown) within microprocessor 110. Then, at 192, microprocessor 110 checks to see if there are entries in XQ 23. If there are some entries, a zero result is indicated at the branch 192 directing the microprocessor 110 to path 194 to return to idle scan at 193. If there is work to do in XQ 23, then asynchronous device operations are not initiated via MRU-LRU 40. If XQ 23 is empty, then and only then will control 33 schedule device operations using the present invention. Microprocessor 110 then enters a scan for scanning MRU-LRU list 40 such as set forth in table BST-1. The first scanned entry will be the MRU segment identified as being for device D5. Accordingly, microprocessor 110 fetches the entry D5 from BST 137 and has the contents of the device address, MRUP, and LRUP in a work register (not shown) within microprocessor 110.

Then for each fetched entry at 196, the value of LRUP is checked. If LRUP equals zero, then the segment being examined is the LRU segment and the scan is completed. Accordingly, when the brand 196 equals one, the microprocessor returns at 193 to idle scan. If the scanned for segment is not the LRU segment, then the scan of MRU-LRU 40 continues through steps 197, 200, 201 until the scan is completed with no hits (LRUP=0) or until an available device is identified. If only one segment is active, then the MRU segment is also the LRU segment.

The next step at 197 by microprocessor 110 is to check the allocations status of the segment. If the segment is not allocated to any device, then there is no need to institute a device activity. If this is the case, then step 200 is skipped and step 201, later described is performed. In the event the segment is allocated, then at 200 microprocessor 110 checks the logical device table LDT 133 to determine whether or not the device associated with the allocated segment has been selected, i.e., is performing a data processing operation or is repositioning, i.e., a free-standing operation is being performed by the device. Either one of these conditions indicates that the identified device 13 is currently busy. Accordingly, then step 201 is entered such that the next entry, MRUP-1 can be examined. Step 201 enables microprocessor 110 to fetch the MRU-1 segment which in BST-1 is the sixth entry. Then steps 196, 197 and 200 are repeated until the end of the scan or until a device associated with an allocated segment and is not busy is identified. In that case at 202, microprocessor 110 determines whether the device is in a read or write mode by reading BST 137 section 174. If the device is in the read mode, a read-ahead is scheduled as indicated by numeral 203 and explained with respect to FIG. 9. On the other hand, if the device is in a write mode, a write tape operation is performed at 204 and as shown in FIG. 8.

It is appreciated that a complete scan of MRU-LRU 40 includes fetching each of the entries shown in BST-1 from control store 111, and placing such fetched entry in a work register (not shown) within microprocessor 110 which is a usual data processing operation. Examination of the entries allows the execution of the FIG. 7 illustrated logic. Steps 203 and 204 of FIG. 7 represent calls to the routines shown in FIGS. 8 and 9, respectively. In executing the FIG. 8 illustrated logic, a write determination was made by microprocessor 110. First, the BRT 141 register (FIG. 6) containing the entry associated with the first received record presently stored in the buffer segment associated with the addressed device, identified by the search in FIG. 7, is fetched and stored in a work register (not shown) of microprocessor 110. At 211, microprocessor 110 examines section 185 of the BRT 141 entry to determine whether or not the first received record in the buffer segment is a complete record (RC=1). If not, program group CUCS 155 is entered to look for additional work. If additional work is not found, then the FIG. 7 illustrated search is repeated. The repetition can begin at the MRU or can begin at the device last examined, it being preferred that the MRU is examined again. Alternatively, microprocessor 110 can return to MRU-LRU 40 scan without the intervening check for higher priority work.

In the event the record is complete at 211, microprocessor 110 at 212 checks to see whether or not recording or writing is inhibited (WR INH). For the control unit 11 a write inhibition is recorded in CUT 130 while for the devices, it is recorded in the LDT 133. If there is a write inhibition at 212, CUCS 155 is entered in the same manner as if an incomplete record were found at 211. If both conditions at 211 and 212 are positive, a flag (not shown) in control store 111 is set to the active condition at 213 indicating a write operation is to be scheduled. At this point in time, XQ 23 has not yet been altered, i.e., it is still all zeros, therefore no device work has been scheduled. At 214, microprocessor 110 examines DOT 136 to see if the addressed device can be started, if yes, the addressed device is started via the appropriate device adapter 85. Then at 216, the number of records to be transferred from the buffer segment in buffer 15 to the tape recorder is calculated. This calculation by microprocessor 110 results in maximizing performance of subsystem 10 by enabling transfer of a number of records between an addressed device 13 and buffer 15 in each device 13 operation. This operation reduces the number of device 13 starts and stops. Such a transfer of multiple records is termed "stream breaking." When the calculated minimum number of records have been transferred in a given "stream," receipt of a host 12 input/output command for access to the device 13 participating in the streaming stops the transfer, breaks the stream. In this manner shortened response times for host 12 issued input/output commands is achieved. LDT 133 section 402 (FIG. 16) for each of the buffer segments, (logical devices) indicates record size. From this record size, microprocessor 110 with predetermined knowledge of the format on the tape in the tape recorder, can ascertain the length of tape needed for receiving each record along with intervening interblock gaps (IBG) which are usually recorded on tape for identifying records. This length calculation is combined with acceleration/deceleration characteristics of the reel-to-reel tape drive devices 13 for yielding a transfer time for each of the devices 13. Since there can be overlapped operations provided by the preparatory tape operation mentioned earlier, the acceleration characteristics of the reel-to-reel tape drive are masked from the synchronous operations. In any event, time of transfer of records is computed based upon record size. In a preferred form of maximizing interleaving, a maximal time for bursts of signal transfers between buffer 15 and any device 13 is set for each storage subsystem 10; each such storage subsystem can have a different time slice limitation depending upon its application. The time it takes to transfer one record is divided into the maximal time slice permitted for yielding an integral number of records. This integral number is a minimal number of records to be transferred in each asynchronous operation. In any event, after calculating the record number at 216, microprocessor 110 at 217 transfers the device address and write command, plus the number of records to XQ 23 to be interpreted later by CUDM 158 for recording the buffered data onto a tape recorder device 13 from the buffer segment represented by the just-examined entry. After queuing this device activity in XQ 23, microprocessor 110 returns to idle scan at 218. As a part of idle scan, XQ 23 is examined and a device operation is scheduled for a recording or writing operation. Since recording operations from a buffer into a tape drive is well-known, that portion of the subsystem 110 operation is not described.

When a read-ahead is indicated in FIG. 7 at 203, the logic of operations of FIG. 9 are performed by microprocessor 110 beginning at the entry 220 which corresponds to 203 of FIG. 7. First, microprocessor 110 checks CUT 130 to see if control unit 11 is inhibited from reading ahead (RA). If yes, CUCS 155 is performed as described with respect to FIG. 8 with the alternatives also being equally applicable to this logic. If there is no inhibition of control unit 11 for read-ahead, then at 222, microprocessor 110 fetches the direction of motion indicator, viz whether the tape direction of motion is forward or backward, from DOT 136 (FIG. 14) section 388. Remember in the read mode, a read can be in either direction of tape motion while recording is only in one direction of tape motion, i.e., forward. Then, at 223, microprocessor checks LDT 133, section 401 (FIG. 16), to see if read-ahead has been inhibited (not permitted) for a particular device. If so, CUCS 155 is entered. If read-ahead is permitted, then at 224, microprocessor 110 checks section 406 of CXT 143 (FIG. 17) to see if there is a current channel transfer occurring between buffer 15 and host system 12. If there is a transfer currently existing (X=1 of section 406) microprocessor 110 follows path 225 for performing step 226 which queues a read operation in XQ 23. In other words, transfer of signals from buffer 15 to host system can occur at such a rate that subsequent reading of tape in a device 13 will not overflow the allocated buffer segment. On the other hand, if there is no current channel transfer indicated by CXT 143, then whether or not the buffer segment is full is tested at 227. If it is not full, a read of one block of data is scheduled at 226. If it is full, of course, then no read is scheduled to prevent overrun of the buffer segment. Then other work is looked for through CUCS 155.

A more detailed operation illustration of the logic described above is found in FIGS. 10 through 14. In the write asynchronous operation, a minimal number of records are transferred to tape to reduce the starting and stopping action of the reel-to-reel tape devices 13. The same operation can be performed for read operations such that the buffer can be maximally used. However, since record length can be indeterminate and buffer size can be tuned to receive less than two full records, a single record read for read-ahead can be achieved while still providing good performance. On small records, it may be better to read a plurality of records in one tape motion. In any event, the determination of the number of records to read is ascertained by the desired performance and the ratio of the size of the buffer segment to record size being handled through the buffer. Such calculations are omitted for brevity, and since they are algorithmic in nature, are not pertinent to the subject matter sought to be patented.

Figure 10:
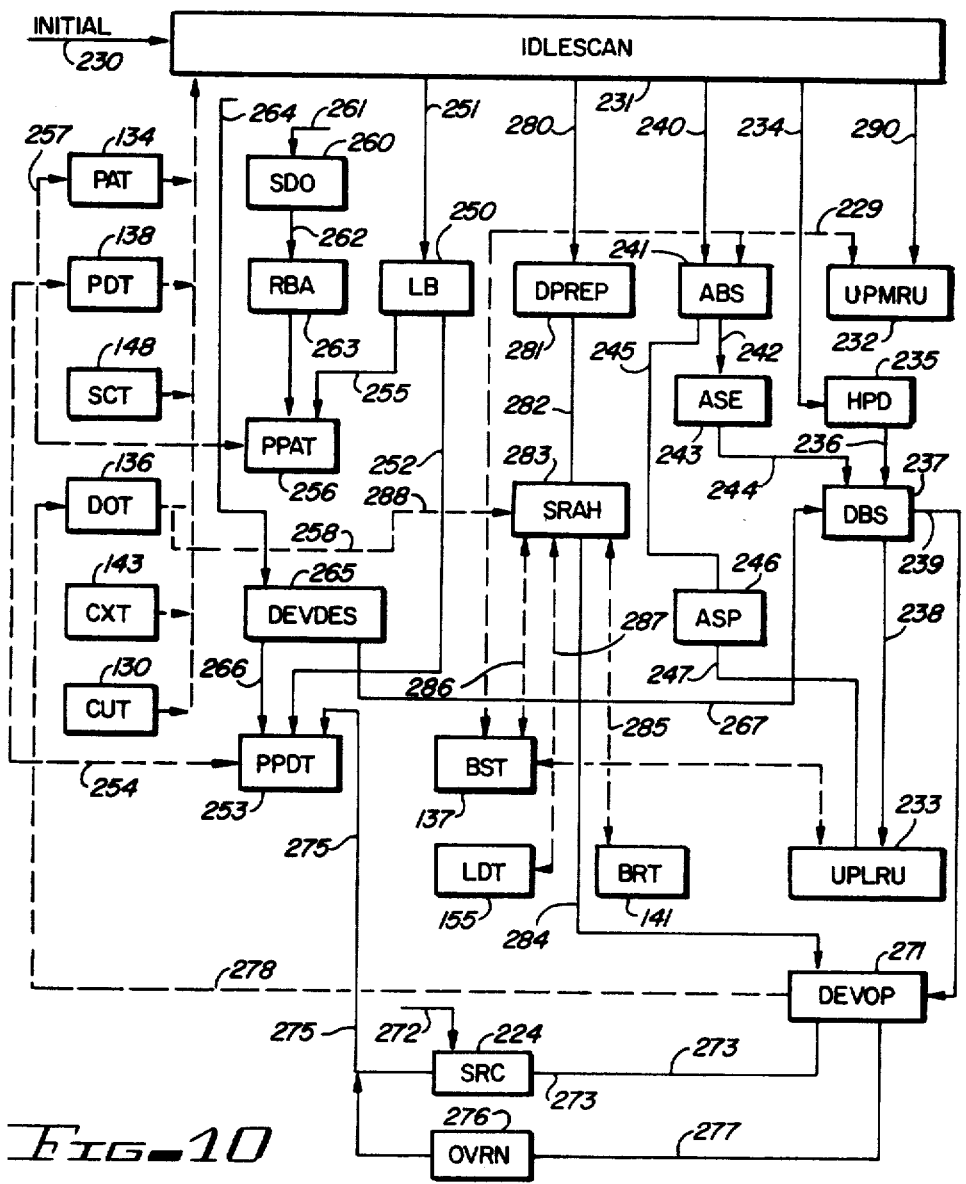
FIG. 10 is a logic flow diagram showing the general arrangement of control within the peripheral subsystems of FIGS. 1 and 2 for implementing the present invention in a preferred mode.

FIG. 10 illustrates that portion of control 33 that implements the invention in a present preferred embodiment. Idle scan 231 is the logic for microprocessor 110 to look for work to do when no work has been imposed upon the microprocessor 110 due to interrupt signals or commands from a host. At POR (power on reset) or on initial power up, microprocessor 110 follows the usual initialization procedures as indicated by arrow 230. Such initialization includes operational verification of various parts of microprocessor 110. Upon successful completion of such initialization, idle scan 231 is continuously executed by microprocessor 110 until it receives the first interrupt for performing subsystem 110 functions. The FIG. 10 description assumes that subsystem 110 has been operating such that entries in the various tables represent a present status of subsystem 110. In looking for work to do, microprocessor 110 examines several of the tables shown in FIG. 4. For example, PAT 134 is examined to see if an allocation of a buffered segment in buffer 15 should be made. In a similar manner, deallocation is examined in PDT 138. Various sequencing operations are examined in SCT 148 including updating the MRU end portion of MRU-LRU 40. DOT 136 is examined for XQ 23 scheduled device operations. Other tables are examined for other operations to be performed which are not pertinent to the present invention and are not described for that reason. FIG. 10 also illustrates selected logic modules which enable microprocessor 110 to perform functions related directly to the present invention. In particular, those logic modules included in CUBM 150 and CUDM 158 which directly pertain to the invention are illustrated.

Logic module UPMRU 232, a portion of CUBM 150, is activated by idle scan 231 in response to its sensing of an SCT 148 indication that the MRU-LRU 40 should be updated. SCT 148 is described with respect to FIG. 15. SCT 148 has a register containing bit positions for each of the devices 13. A bit position set to binary 1 indicates that a channel 14 access to a buffer segment allocated to the corresponding device 13 has been made. Accordingly, MRU is updated as described for tables BST 1 through BST 4 and as later described with respect to FIG. 11.

Figure 12:
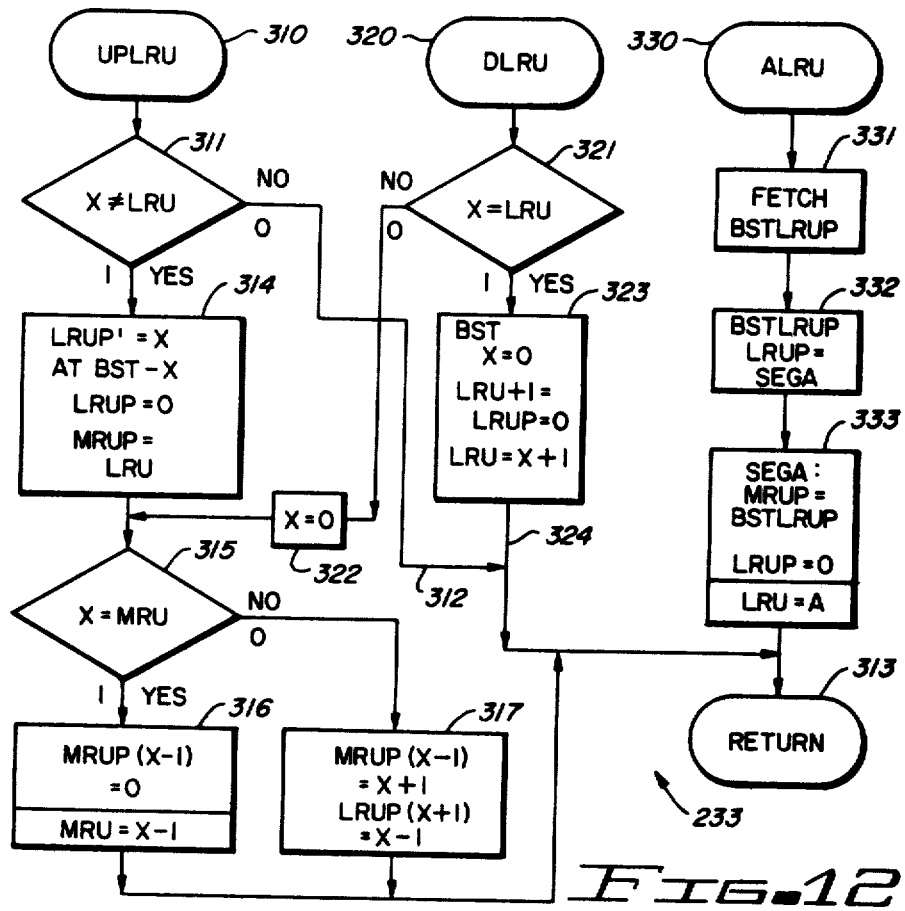
FIG. 12 is a logic flow diagram showing updating and change of an LRU portion of the FIG. 10 illustrated control.

UPLRU 233, also a logic module within CUBM 150 and described later with respect to FIG. 12, cooperates with BST 137 in electrically indicating a new LRU segment. The description of FIG. 12 is coordinated with the tables of BST 137 shown in FIG. 5. UPLRU 233 is selectively activated through a plurality of logic paths. First, idle scan 231 enables microprocessor 110 to scan PDT 138 for pending deallocations. When PDT 138 signifies that a buffer segment is to be deallocated, then idle scan 231 enables microprocessor 110 to follow logic path 234 to execute logic module HPD 235.

As a part of idle scan 231, microprocessor 110, through data path 280, activates DPREP 281 for preparing a device for data transfer. XQ 23 of DOT 136 is scanned through DPREP 281 to find a device 13 for a possible read ahead or to perform an asynchronous recording operation. If a device in the data transfer queue XQ23 has been selected, then no device has been prepared for an ensuing data processing operation. DPREP 281 activates recording logic modules (not shown nor described) for instituting an asynchronous recording operation. For read ahead operations, microprocessor 110 follows logic path 282 to SRAH 283 for scheduling a read ahead from device 13 into buffer 15. MRU-LRU 40 is scanned for a device to do a read ahead operation and at the same time determines whether or not an asynchronous recording operation can be instituted. From SRAH 283 microprocessor 110 through path 284 activates DEVOP 271. SRAH 283 cooperates with DOT 136 as indicated by line 288 and with LDT 133 as indicated by line 287. SRAH 283 is explained in detail with respect to FIG. 13.

When microprocessor 110 through module ABS 241 determines that an allocation is to proceed, it first checks the BST 137 (as indicated by line 229) to determine the block size of the upcoming data operation for the allocated buffer segment. If the block size, i.e., record size, is such that a single segment can handle data processing operations, then ASE 243 is activated via path 242. In the event that all segments are allocated, then ASE 243 enables microprocessor 110 to follow logic path 244 to initiate a deallocation via module DBS 137. If microprocessor at ABS 241 determines that plural buffer segments are required for handling the ensuing data processing operation, then it follows logic path 245 to ASP 246 which allocates a plurality of segments to the upcoming data processing operation. Microprocessor 110, when executing ASP 246 may have to combine a plurality of buffer segments into one partition. Accordingly, some of the buffer segments are deleted from the MRU-LRU 40, such as indicated in table BST-137. To achieve this, microprocessor 110 follows logic path 247 for activating logic module UPLRU 233. It is seen that allocation and deallocation of buffer segments have a close activating relationship to MRU-LRU 40.

A further function in the FIG. 2 illustrated peripheral subsystem is to balance the buffer load between the two control units 11, CU-0 and CU-1. One of the two control units 11 may determine through means beyond the scope of the present description that its buffer 15 is overloaded. Accordingly, its status store 100 will communicate with status store 100 of the other CU via path 101 (FIG. 2) requesting a load-balancing function. Such a request is lodged in CUT 130 which is also scanned by microprocessor 110 during idle scan 231. When microprocessor 110 sees a request for load-balancing in CUT 130, it then follows logic path 251 to activate a load-balancing module LB 250. LB 250 is a portion of CUBM 150. Microprocessor 110 in executing LB 250 determines according to predetermined criteria that data processing operations can be switched between the two control units 11. As a result, a device 13 currently operating with CU-0 may be transferred to CU-1. This results in a requirement for deallocating a buffer segment presently allocated to the device being transferred. Further, a device received from the other control unit 11 requires allocation of a buffer segment such that data processing operations can ensue. To this end, microprocessor 110 follows logic path 255 to activate module PPAT 256 for requesting an allocation of buffer 15 segment for the received and new device 13 assignment. PPAT 256 enables microprocessor 110 to place the entry into PAT 134 as indicated by line 257. Deallocation aspects are handled by microprocessor 110 via logic path 252 to module PPDT 253 which inserts the request into PDT 138 indicated by line 254. Once the requests have been inserted into PAT 134 or PDT 138, the previously described operations with respect to UPLRU 233 ensue.

Segment allocation can also occur when host system 12 supplies a MODESET channel command to a control unit 11. Since a large portion of device selection and command execution is handled by various interrupt levels beyond the scope of the present description, it suffices to say that execution of those functions results in entries into PAT 134. In FIG. 10, arrow 261 represents such an interrupt to microprocessor 110 while SDO 260 represents the select device operation executed in response to the interrupt. That is, devices are selected in accordance with the interface protocol identified in the background of the invention. SDO 260 is a portion of CUCE 152 and can include portions of CUCS 155. In any event, those interrupt driven logic modules can activate logic path 262. Logic module RBA 263 a portion of CUBM 150, enables microprocessor 110 to queue a device that is addressed by SDO 260 from host system 12 by inserting an entry into PAT 134. First, however, RBA 263 causes microprocessor 110 to check BST 137 to determine if buffer 15 data storage space has been already allocated to this addressed device. If so, data processing operation is imminent and as a result, microprocessor 110 modifies BST 137 to show that the allocated buffer segment is "engaged," i.e., data processing is imminent. Otherwise, if allocation is required, RBA 263 causes microprocessor 110 to activate PPAT 256 in the same manner that LB 250 activated PPAT 256.

Host system 12 also may command subsystem 10 to deselect device 13. This action is represented in FIG. 10 by arrow 264 representing the interrupt to microprocessor 110 resulting from control unit 11 receiving such a deselect command. Modules DEVDES 265 and those portions of CUCE 152 and CUCS 155 activate the actual deselection processes using known subsystem techniques. Additionally, a buffer 15 segment has to be deallocated; accordingly, DEVDES 265 causes microprocessor 110 to request a pending deallocation over logic path 266 by activating PPDT 253.

The FIG. 2 illustrated subsystem, as implemented in part in FIG. 10 illustrated control, also monitors each data processing operation to determine if the record size indicated BST 137 is being maintained or is being changed. If there is a change in record size, then operation of buffer 15 is dynamically altered to accommodate that change in record size. This can result in deallocation of a buffer segment and the reallocation of buffer 15 for accommodating larger sized partitions. If there is an increase in block size, a deallocation is required. Such activity can result from two logic modules. The first module is SRC 274 which is the logic module enabling microprocessor 110 to process certain control information at the end of a transfer into buffer 15 whether it be from host system 12 or a device 13. Arrow 272 represents activation of module 274 from a host system such as would be handled by CUCB 151. Upon the completion of a read operation DEVOP 271 also activates SRC 274 via logic path 273. SRC 274 enables microprocessor 110 to detect an increase in block size as to require reallocation. Then, microprocessor 110, following path 275 activates PPDT 253. In a similar manner, if an overrun occurs, i.e., more signals are supplied to buffer 15 than can be accommodated in the present allocated partition, microprocessor 110 via OVRN 276, activated through path 277 from DEVOP 271, also activates PPDT 253 which is also a portion of CUBM 150. Microprocessor 110 in executing HPD 235 searches PDT 138 to gather identifications of all buffer segments of buffer 15 which qualify for deallocation. Remember idle scan 231 enabled microprocessor 110 to respond to any request for deallocation to activate HPD 235. Since scanning tables is a well-known processing technique, HPD 235 is not further described.

HPD 235 enables microprocessor 110 to follow logic path 236 to call logic module DBS 237 which is also a portion of CUBM 150. DBS 237 enables microprocessor 110 to verify that the specified segment to be deallocated is not presently in an operational state with a device 13. This action is checked by reading an appropriate entry (not shown) from LDT 133. In the event that the buffer segment to be deallocated has residual data in it, a device 13 write or recording operation is scheduled via logic path 239 which activates module DEVOP 271 (a portion of CUDM 158). DEVOP 271 in turn enters the requested operation by inserting the requested operation into XQ 23 of DOT 136 as indicated by line 278. Upon completion of such a device write operation, BST 137 is informed that the segment is "scheduled for freeing," i.e., eligible for deallocation. In any event, when the segment to be deallocated is free of data, then DBS 237 activates UPLRU 233 via logic path 238. In the event the segment being deallocated is merged with other segments to form a larger buffer partition, then the entire partition is deallocated; that is, when a pair of segments is deallocated even though only one segment was indicated in PDT 138. In the same manner a quad segment partition results in deallocation of all four buffer segments. An option here occurs, all four or both segments of the larger partitions can be added simultaneously to MRU-LRU 40 as LRU segments. In the alternative, the pairing or quad combination can be maintained irrespective of allocation/deallocation, such that separate desegmentation of the partition could be required. Insofar as practicing the present invention, either option can be practiced with equal facility.

Allocation of a buffer 15 segment does not alter the location of that buffer segment within MRU-LRU 40; however, a request for allocation of a buffer segment can cause a deallocation of a buffer segment as is common in replacement buffer functions. Accordingly, when microprocessor 110 through idlescan 231 senses a pending allocation in PAT 134, microprocessor 110 follows logic path 240 to ABS 241 for allocating the buffer segments to a device 13 indicated in PAT 134. PAT 134 is a FIFO (first in, first out) queue such that ABS 241 enables microprocessor 110 to obtain the device address first received in PAT 134. Before taking any action, microprocessor 110 in following logic of ABS 241, scans PDT 138 to see if there is a pending deallocation on the same device address. If so, there is no reason to allocate a new segment. Accordingly, the entry in PAT 134 is erased. Microprocessor 110 through ABS 241 handles each and every entry of PAT 134.

FIG. 11 illustrates the logic of UPMRU 232. Logic entry path at 290 leads to a loop of logic steps which scan SCT 148 (FIG. 15) in the following described manner. At 291, a first bit for a first device address is examined to see whether or not MRU-LRU 40 should be updated at the MRU end. If the bit is set, an MRU update is being requested (MRUR = 1). At 292 the logic branch determines whether or not a request for MRU for the addressed device has been detected (MRUR). If not, the loop continues through logic step 293 which determines whether or not all of the entries in SCT 148 have been evaluated. If not, the next device address for SCT 148 is generated at 294 by adding one. This causes a shift in bit position of the later described SCT 148 register. Following 294, the logic path 295 re-enters the just described loop.

On the other hand, if at 293 the last device had been examined for MRUR, then microprocessor 110 returns to idle scan at 296. At 292, if there is an outstanding MRUR for the device being examined from SCT 148, then MRU-LRU 40 is updated. First at 300, microprocessor 110 resets the device "X" bit to zero such that MRUR of that device in SCT 148 is now zero. At 301, microprocessor 110 determines whether or not device "X" is already the most recently used segment. If it is, then logic step 302 sets MRU=X. Following step 302, microprocessor 110 returns to the loop 291-295 at step 293. If segment "X" is not the MRU buffer segment, it must be made the MRU buffer segment. At step 303, the BST 137 entry for device "X" is updated. The first portion of the step sets the MRUP 172 for device "X" equal to zero. This action identifies "X" as the most recently used device as indicated by an access to buffer 15 by input/output channel 14. Next the LRUP 173 for device "X" is set equal to the previous MRU device address; thirdly, MRUP of the former MRU segment is made equal to "X". At 304 a work register (not shown) in microprocessor 110 which identifies MRU is set to "X". This action corresponds to the procedures described for table BST-137 which became the new MRU device. This action does not complete the updating of MRU-LRU 40. At 305, microprocessor 110 checks to see whether or not the segment "X" is the least recently used (LRU) segment. If the new MRU was the old LRU, then the situation exists as set forth in BST-137 for old LRU device. Further action is required at 306 wherein the LRUP of the X+1 segment (LRU +1 segment) is made equal to zero. The next to the least recently used segment now becomes the least recently used segment. Then the work register (not shown) in microprocessor 110 for identifying the LRU, is set to X+1; in BST-137 this corresponds to placing a device identification in this last referenced work register. Then logic path 307 is followed to step 293 as previously described.

If at 305 segment X is not LRU, then segment X has a position in the middle of the MRU-LRU 40 list. Since segment X is moved to the MRU position, the gap left in list 40 must be closed. This is achieved at step 308. Returning to step 308, the LRUP of device X+1 is made equal to X−1 while the MRUP of X−1 is made equal to X+1. This action closes the list to make it continuous as is necessary for implementing the present invention. Upon completion of step 308, microprocessor 110 follows path 307 to step 293. Based on all of the above, it is seen that UPMRU 232 actions are based entirely on channel 14 activity.

In quite a different set of circumstances, UPLRU 233 of FIG. 12 can be activated by any one of three possible entries. Entry 310 corresponds to numerals 238 and 247 of FIG. 10. The first function is at 311 which determines whether or not the segment X, which is the segment being considered in altering the LRU end of MRU-LRU list 40, is the current LRU segments. If it is the current LRU segment, then no further action is required and logic path 312 is followed to return to the calling logic module at 313. Generally, X will not be the LRU segment accordingly, step 314 is performed wherein the LRUP 173 of the previous LRU is made equal to X. Accordingly, in the BST 137 register for segment X, the LRUP 173 is made equal to 0. Continuing to step 314, the MRUP of sevice X is made equal to the old LRU segment, (MRUP=LRU).

Next at 314 microprocessor 110 determines whether or not segment X is the old MRU segment. The old MRU segment can be deallocated and thus become the new LRU segment. If it is the old MRU segment, then the previous MRU-1 segment becomes MRU and the previous LRU segment becomes segment LRU+1. This action is achieved in step 316 by making MRUP of the X−1 segment equal to zero. X−1 in this case, is the MRU-1 segment. At the same time, MRU is set to X−1. Since the LRU status was updated at 314, no further action is required; therefore path 312 is followed to return to the calling module at 313.

In the event that segment X is not the old MRU at 315, microprocessor 110 goes to step 317. This action means segment X was taken from the middle of the MRU-LRU 40 list requiring that the list be closed in the same manner that it was closed as explained with respect to FIG. 11 UPMRU 232 in step 308. Steps 317 and 308 are identical.

The other two entries into UPLRU 233 relate to deleting a segment or adding a segment from and to the MRU-LRU 40 list as previously described.

The entry DLRU 320 results in deletion of a segment from MRU-LRU 40. At 321 microprocessor 110 determines whether or not the segment "X" to be deleted is the LRU segment. If it is not the LRU segment, the entry for X is zeroed at 322. This action is achieved by looking at the segment address independent of the device address, and making the register unaddressable through the usual MRUP and LRUP addressing techniques, as previously described. Then step 315 is entered for completing the segment deletion. However, if segment X is the LRU segment, then at step 323, the BST 137 register containing the entry for segment X is erased as set forth for step 322. Also, the LRU+1 segment is made equal to the LRU segment by setting its LRUP section equal to zero. Therefore, the new LRU is the old X+1 segment. Microprocessor 110 then follows path 324 to return at 313.

To add a segment to the MRU-LRU 40 list, the entry at ALRU 330 is used. First, at 331, microprocessor 110 fetches BSTLRUP from a work register (not shown) within microprocessor 110 which points to the BST 137 LRU segment. For that fetched segment, which is the old LRU segment the LRUP 173 of the former LRU segment entry is made equal to the added segment. Then at 333, the MRUP 172 of the added segment's register 170 (which now is an entry in BST 137) identifies the buffer segment associated with former LRU. Finally LRU is made equal to the newly added segment. This action occurs in a work register of microprocessor 110. The microprocessor 110 returns to calling logic module at 313.

The updating and maintenance of MRU-LRU 40 has been completed. Now, in order to understand the practice of the invention in the disclosed embodiment, the scanning of MRU-LRU 40 for initiating an asynchronous read ahead or an asynchronous write is described with respect to the select read ahead logic module (SRAH) 283 shown in FIG. 13. The purpose of SRAH 283 is to enable microprocessor 110 to create device activity in anticipation of host system 12 requests such that performance enhancement of subsystem 10 can be maximized. Activation of SRAH 283 occurs at 340 with an AND/OR logic function consisting of steps 341 and 342 being first executed. If either read ahead is inhibited for a control unit 11 or buffer 15, asynchronous operations are inhibited by logic OR function 344. Logic path 345 then leads microprocessor 110 to CUCS 155. CUCS 155 is executed to insure completion of a host system 12 command previously received by control unit 11. On the other hand, if the AND condition represented by numeral 343 is satisfied, i.e., neither read ahead nor asynchronous buffered write are inhibited, then at 350 the BST 137 segment entry which is MRU is fetched and stored in microprocessor 110 work registers (not shown). At 351 microprocessor 110 examines the fetched entry to see whether or not the identified segment is allocated. If the segment is not allocated, then a scan is instituted which includes steps 352 and 353. At 352 microprocessor 110 determines whether or not the addressed segment "X" for a BST 137 entry is the LRU segment. This is determined by examining LRUP 173 for zero. If it is the LRU segment then CUCS 155 is performed. If it is not the LRU segment, the buffer segment address "X" is incremented at 353 and steps 350 and 351 repeated. As soon as an allocated segment is found, i.e., a logical device is active in that a device 13 has an allocated segment from buffer 15; then at step 354 microprocessor 110 determines whether or not the corresponding device is busy. If the device is busy, no asynchronous operation can be instituted. Accordingly, the just described scan loop 350, 351, 352 and 353 is reentered via path 355 at step 352. On the other hand, if the device 13 associated with the logical device is not selected, i.e., not busy or is not repositioning, i.e., not performing a stand-alone operation, then the logical device is eligibile for asynchronous operations. Accordingly, at 355 microprocessor 110 fetches device status from device status table DST 140. DST 140 contains the last reported status for the device associated with the logical device being considered for asynchronous operations. Then at 356 the record size indicator from LDT 133 section 402 (FIG. 16) for the logical device is fetched for the purpose of determining the number of records that can be transferred in the ensuing asynchronous data processing operation. At 357 the number of records that are expected to be transferred is computed. This number is a function of the number of records that can be transferred between buffer 15 and the device 13 in a preset time period based upon record length. Then following path 358 microprocessor 110 at 360 reads BST 137 section 174 (Fig. 5) to determine the mode of operation, i.e., is the data processing operation a read from device 13 or a write to device 13.

For the read mode, microprocessor 110 at 361 determines whether or not read ahead is permitted for the control unit 11. Read ahead could be inhibited for error control purposes during an error recovery procedure or during diagnostic procedures. If read ahead is inhibited (indicated in CUT 130), then microprocessor 110 follows path 364 to CUCS 155. If read ahead is permitted, then at 62 microprocessor 110 fetches the direction of tape motion for the data processing operation, i.e., either forward or backward, from DOT 136 section 388 (FIG. 14) and places the direction indicator in a work register (not shown) within microprocessor 110. Then at 363 microprocessor 110 determines whether or not read ahead is permitted for the logical device being considered for the asynchronous read operation (indicated in LDT 133 section 401, FIG. 16). If it is not, CUCS 155 is entered via path 364. If read ahead is permitted at 363, then at 365 microprocessor 110 examines CXT 143 to see if a channel-buffer data transfer is presently occurring for the device being considered for asynchronous reading. If there is a transfer to channel occurring, then because of the channel rates buffer overrun cannot occur and a device operation is instituted at 366 by activating logic module DEVOP 271 as shown in FIG. 10. If a channel transfer is not occurring for the addressed logical device, then the number of free bytes of buffer space is determined at 367 for determining whether or not sufficient buffer space within the segment of interest is available to justify a read ahead operation. If yes then a device operation is instituted at 366 by activating logic module DEVOP 271. It should be noted that the computation at step 357 designates a minimum number of records. If that minimum number is not met, then microprocessor 110 returns to CUCS 155 through path 364.

On the other hand if a write mode is detected in BST 137 at 360, then at 370, BRT 141 is examined for the eligible device X to see if there is a complete record in the buffer segment of logical device (RC=1 in BRT 181). If there is not a complete record in buffer 15 an asynchronous write cannot occur. Accordingly, microprocessor 110 returns to CUCS 155 via path 364. If there is a complete record for asynchronous writing, then at 371 microprocessor 110 determines whether or not such asynchronous writes are inhibited. Such inhibition may be caused by error recovery procedures for error control purposes. If so, then CUCS 155 is entered as previously described. Otherwise, a device operation is initiated at 372 for causing an asynchronous recording operation to occur.

Figure 14:
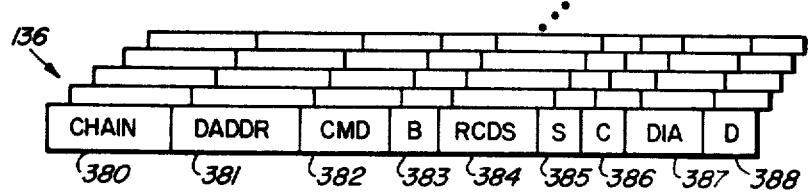
FIG. 14 illustrates a set of registers of the control store shown in FIG. 4 relating to device operations.

DOT 136 of control store 111 is shown in FIG. 14. There is a single register for each device that has scheduled active or completed operations including the devices identified in FIFO list XQ 23. Each register in DOT 136 has several sections. The first section is a chain section 380 which stores the address of the next register in the FIFO chain for XQ 23. The first entry of DOT 136 is identified in a register pointed to by a work register (not shown) in microprocessor 110. All of the other registers of DOT 136 are identified through the chain linking of sections 380. Section 381 contains the logical device address related to the signals stored in the respective registers. Section 382 contains the device command code that is scheduled to be executed on the addressed device 13 indicated in section 381. Such command code includes implicit specifications of operations mode, read or write, direction, forward or backward, and the type of queue involved, i.e., CCQ, ICQ or XQ is indicated. Section 383 is a single bit indicating whether or not a buffer operation is involved, i.e., some device tape motions do not require buffer activity, hence bit B would be zero. The number of records subjected to the buffer transfer is indicated in section 384. When section 384 is non zero and section 383 is a binary zero, the command code in section 382 has to be a read or read backward, which means it is a forward or backward space operation for moving the tape over a designated number of records previously recorded on the tape. Otherwise, it is the minimum number of records to be transferred as explained earlier in the specification. Section 385 is a so-called start bit indicating that the device operation has in fact started, i.e., the device indicated in section 381 has been selected or is already prepared for a data processing operation. Section 386 indicates whether or not the device operation indicated in section 382 has been completed. Section 387 indicates the address of DIA 139 which contains information concerning the device and not pertinent to the present invention. "D" bit 388 indicates direction of tape 54 motion, viz forward or backward. The ellipsis indicates that in a practical embodiment it may be desired to have additional sections for the respective registers for the purpose of facilitating control of the subsystem, particularly operation of a device 13.

Figure 15:
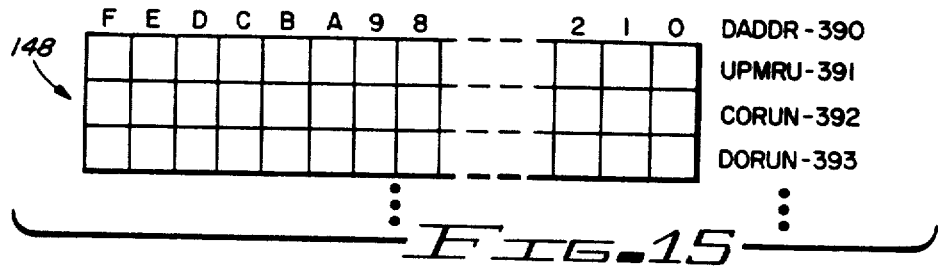
FIG. 15 illustrates a set of registers from the FIG. 4 illustrated control store relating to sequence control of a plurality of peripheral devices based upon host systems to peripheral subsystem actions.

SCT 148 is shown in abbreviated form in FIG. 15. Only those fields of interest to the present invention are illustrated. Each logical device address is indicated in section 390 of SCT 148. For each such device address there is a separate register which in FIG. 15 is vertically oriented; only three bits of each register are shown for purposes of brevity. Scanning SCT 148 first includes reading the register for device address zero, then device one, etc. The UPMRU section 391 has one bit position to indicate whether or not UPMRU 232 should be activated for updating MRU-LRU 40. If the table is oriented such that a two-byte register holds each of the entry fields 391, 392, etc., then a known bit shifting technique can be used for addressing the successive bits of the registers for scanning the information fields.

Section 392 indicates whether or not a channel overrun (CORUN) has occurred, that is if an overrun occurs then a segment deallocation followed by allocating a larger segment to the device can be instituted which affects the operation of the invention with respect to UPLRU 233. In a similar manner, section 292 shows a device overrun which has a similar effect on UPLRU 233.

Figure 16:
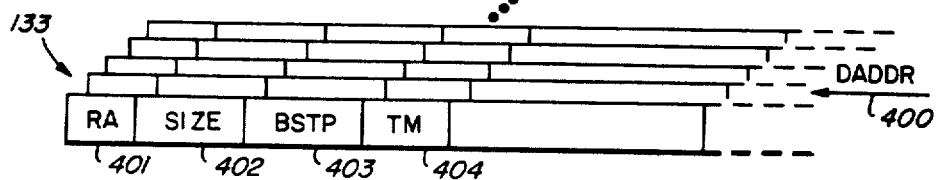
FIG. 16 illustrates a set of registers of the FIG. 4 illustrated control store relating to control of allocated buffer segments with respect to devices, the combination being termed logical devices.

FIG. 16 illustrates a portion of LDT 133. There is one register associated with each device address as indicated by arrow 400, i.e., accesses to the registers are determined by a base address for control store 111 with the offset equal to the device address. In LDT 133, Section 401 contains the read ahead permitted bit as explained with respect to FIG. 13. Section 402 has several bits indicating the size of records being transferred for each data processing operation as explained with respect to FIG. 10. The size section 402 information is dynamic as monitored and dynamically changed to accommodate changes in data processing operations. Section 403 contains an address which points to the entry in BST 137 (BSTP is the pointer to BST 137) such that references to LDT 133 facilitate references to BST 137. A tape-mark section 404 indicates whether a tape mark was last written to or read from a device 13. In a practical embodiment, of course, additional control fields for the logical device may be added to LDT 133, the sections illustrated are those pertinent to practicing the present invention.

FIG. 17 illustrates the single register CXT 143. This register has non-zero information only when an actual data transfer is occurring between input/output channel 14 and buffer 15. Section 405 contains the device address of the logical device associated with such channel transfer. Section 406 indicates whether or not the channel transfer is currently active, i.e., when the channel transfer has been ordered and not yet started, then X=1. Section 406 is a binary zero if the channel transfer had been completed. Section 409 contains the address of the BST 136 registers (FIG. 6) associated with the device identified in section 405, and that is associated with the current channel transfer, i.e., the record currently being transferred.

| GLOSSARY | |
| --- | --- |
| ABS | Allocate buffer segment |
| ASE | Allocate single segment |

GLOSSARY -continued

| | |
|---|---|
| ASP | Allocate segment plurality |
| BRT | Buffer record table |
| BST | Buffer status table |
| CUBM | Control unit buffer management |
| CUDM | Control unit device management |
| CUCB | Control unit channel-buffer |
| CUCE | Control unit command execution |
| CUCS | Control unit command support |
| CUT | Control unit table |
| CXT | Channel transfer table |
| DBS | Deallocate buffer segment |
| DEVDES | Device deselection |
| DEVOP | Device operations control module |
| DOT | Device operation table |
| FIFO | First in, first out |
| LB | Load balance |
| LDT | Logical device table |
| LRU | Least recently used |
| MRU | Most recently used |
| MRU-LRU | List which enables control of asynchromous device operations and replacement |
| OVRN | Overrun (buffer) |
| PAT | Pending allocation table |
| PDT | Pending deallocation table |
| PPAT | Put into pending allocation table |
| RBA | Request buffer allocation |
| RC | Record complete list for buffer 15 |
| SCT | Sequence control table |
| SDO | Schedule device operation |
| SRC | Set record complete |
| UPLRU | Update MRU-LRU list at LRU end |
| UPMRU | Update MRU-LRU list at MRU end |

While the invention has been particularly shown and described with reference to preferred embodiments thereof, it will be understood by those skilled in the art that various changes in form and details may be made therein without departing from the spirit and scope of the invention.

What is claimed is:

1. In a data processing system, including peripheral data recorders having an addressable data record medium for storing data with recording heads in transducing relationship to said record media, a host processor for issuing commands for the peripheral data recorders, including addresses of the peripheral data recorder to respond to the issued command, calling for transfer of data records between said host processor and said peripheral data recorders, a buffer store for storing said data records, and a storage control unit connected between said host processor, said buffer store and said peripheral data recorders, and being responsive to said issued commands for responding thereto;

the improvement comprising:

storage means in the control unit for storing a command queue and a buffer control table having a buffer record table portion for indicating the location of each record stored in said buffer and a buffer status table portion for indicating to which recorders a section of the buffer store is allocated and for indicating whether a read or write operation is to occur with respect to the indicated section of the buffer store;

said buffer record table portion having an entry therein corresponding to each said section of said buffer store, each of said entries having a change bit indicating that the corresponding records of data have been written into said buffer store by said host processor via respective ones of said issued commands;

said command queue comprising a series of said commands issued by said host processor to said storage control unit and waiting to be executed by said storage control unit to transfer predetermined data between said host processor and said peripheral data recorders through said storage control unit;

said storage control unit including:

first means connected to said storage means for examining said buffer control table to identify an entry in said buffer status table portion that indicates data written into the buffer store by said host processor;

second means coupled to said first means and to said command queue storage for being responsive to said first means identifying an entry that indicates data written to said buffer store for forming a command in said command queue storage for directing the control unit to transfer the data records stored in said section of the buffer store corresponding to said identified entry from said buffer store to said peripheral data recorder;

third means connected between said second means and said storage for entering said formed command into said command queue; and device manager means coupled to said storage for being responsive to said command queue for executing said formed command when the peripheral data recorder having allocation of said identified section of the buffer store is not busy or said host processor issued commands when the addressed data recorder is not busy;

whereby the transfer of data stored in the written-to section of the buffer store to said peripheral data recorder is accomplished without intervention of said host processor.

2. In the data processing system as claimed in claim 1 wherein, said heads and said record medium are relatively movable;

said storage control unit having means responsive to said formed command for issuing a command to said peripheral data recorder for causing the peripheral data recorder to relatively move said record medium and said heads for relatively positioning same in preparation for data recording;

said storage control unit having means for accepting further host processor issued commands and for placing such further host processor issued commands in said command queue if said peripheral data recorder is busy.

3. In the data processing system, as claimed in claim 1, further comprising:

fourth means in said control means and coupled to said storage means for being responsive to read indication for forming a command in said command queue storage for directing the control unit to transfer predetermined data records stored in a second one of said data records to said buffer store such that the data records to be read by the host processor are stored in the buffer store before the host processor issues a command requesting transfer of such data records from second one of said data recorders.

4. In a data processing system, including a peripheral data recorder for relatively moving a record medium with respect to recording heads, a host processor for issuing commands calling for the transfer of data as a succession of data records between said host processor and said peripheral data recorder, a buffer store for storing said data records in any one of a plurality of addressable and allocatable sections, storage means for storing system control information, and a storage control unit for controlling transfers of said data records between said host processor, said buffer store and said peripheral data recorder, a method for maintaining data storage space in said one of said sections in said buffer store for receiving new data records from said host processor without having to transfer a data record out of said buffer store at the time said new data record is received;

said method comprising the steps of:

storing in said storage means a queue of commands issued by said host processor and waiting to be executed by said storage control unit;

storing in said storing means a buffer control table having a buffer record table portion with an entry corresponding to each data record stored in said buffer store and a buffer status table portion for all records stored in one allocatable section of said buffer store and having a read/write bit for indicating whelher the records of data corresponding to said buffer status table portion entry have been written into the buffer store by said host processor via said storage control unit;

identifying in said buffer control table an entry of said buffer status portion having its said read/write bit set to write;

forming a command directing the transfer of a data record to said peripheral data recorder when the read/write bit is set to write;

storing said formed command in said command queue of said storage means; and executing said formed command to transfer a data record from said buffer store to said peripheral data recorder when said peripheral data recorder is not otherwise busy.

* * * * *